United States Patent
Sekii et al.

(10) Patent No.: US 8,240,920 B2
(45) Date of Patent: Aug. 14, 2012

(54) FLUID DYNAMIC BEARING, MOTOR, AND RECORDING DISK DRIVE APPARATUS

(75) Inventors: Yoichi Sekii, Kyoto (JP); Kazuyoshi Saito, Kyoto (JP); Hisaya Nakagawa, Kyoto (JP)

(73) Assignee: Nidec Corporation, Kyoto (JP)

( * ) Notice: Subject to any disclaimer, the term of this patent is extended or adjusted under 35 U.S.C. 154(b) by 434 days.

(21) Appl. No.: 12/528,098

(22) PCT Filed: May 12, 2008

(86) PCT No.: PCT/JP2008/058745
§ 371 (c)(1),
(2), (4) Date: Aug. 21, 2009

(87) PCT Pub. No.: WO2008/143051
PCT Pub. Date: Nov. 27, 2008

(65) Prior Publication Data
US 2010/0033870 A1   Feb. 11, 2010

(30) Foreign Application Priority Data

May 10, 2007   (JP) .................................. 2007-125429
Dec. 27, 2007  (JP) .................................. 2007-335962

(51) Int. Cl.
*F16C 32/06* (2006.01)
*H02K 5/16* (2006.01)

(52) U.S. Cl. ......................................... 384/107; 310/90

(58) Field of Classification Search .................. 384/100, 384/107, 112, 114, 121; 310/90; 360/99.07, 360/99.08
See application file for complete search history.

(56) References Cited

U.S. PATENT DOCUMENTS

| | | | |
|---|---|---|---|
| 5,623,382 | A | 4/1997 | Moritan et al. |
| 6,828,709 | B2 | 12/2004 | Grantz et al. |
| 6,948,852 | B2 | 9/2005 | Oelsch |
| 7,059,773 | B2 | 6/2006 | Hafen et al. |
| 7,265,467 | B2 | 9/2007 | Sumi |
| 7,290,933 | B2 | 11/2007 | Braun et al. |
| 2005/0163404 | A1 | 7/2005 | Shishido et al. |
| 2006/0097592 | A1* | 5/2006 | Sumi .............................. 310/90 |
| 2006/0120643 | A1* | 6/2006 | Kurimura et al. ............. 384/119 |
| 2007/0036475 | A1 | 2/2007 | Shishido et al. |

(Continued)

FOREIGN PATENT DOCUMENTS

JP   08-331796 A   12/1996

(Continued)

OTHER PUBLICATIONS

Official Communication issued in International Patent Application No. PCT/JP2008/058745, mailed on Aug. 12, 2008.

*Primary Examiner* — James Pilkington
(74) *Attorney, Agent, or Firm* — Keating & Bennett, LLP

(57) ABSTRACT

Channels and gaps inside a bearing mechanism are filled with lubricating oil, and the lubricating oil is retained in a first tapered seal portion arranged radially outward of a sleeve, and a second tapered seal portion arranged between the shaft and an upper cap placed above the sleeve. An arrangement of groove-shaped recessed portions on an inner circumferential surface of the upper cap and raised portions on a lower surface of a top portion thereof contributes to increasing a channel cross-sectional area of a channel provided between the upper cap and the sleeve to connect the first tapered seal portion with the second tapered seal portion.

28 Claims, 31 Drawing Sheets

U.S. PATENT DOCUMENTS

| | | |
|---|---|---|
| 2007/0037652 A1 | 2/2007 | Shishido et al. |
| 2007/0071377 A1 | 3/2007 | Shishido et al. |
| 2007/0140604 A1 | 6/2007 | Shishido et al. |
| 2008/0218019 A1 | 9/2008 | Sumi |
| 2009/0129710 A1 | 5/2009 | Ito et al. |

FOREIGN PATENT DOCUMENTS

| | | |
|---|---|---|
| JP | 11-055897 A | 2/1999 |
| JP | 2001-140861 A | 5/2001 |
| JP | 2005-069382 A | 3/2005 |
| JP | 2005-147395 A | 6/2005 |
| JP | 2005-155912 A | 6/2005 |
| JP | 2006-250193 A | 9/2006 |
| JP | 2007-024267 A | 2/2007 |
| JP | 2007-255593 A | 10/2007 |

* cited by examiner

A — A

C — C

D – D

FLUID DYNAMIC BEARING, MOTOR, AND RECORDING DISK DRIVE APPARATUS

BACKGROUND OF THE INVENTION

1. Field of the Invention

The present invention relates to a fluid dynamic bearing used in an electric motor, an electric motor, and a recording disk drive apparatus including the electric motor with the fluid dynamic bearing.

2. Description of the Related Art

A fluid dynamic bearing is used in many small-sized spindle motors for recording disk drive apparatuses or the like. In such a fluid dynamic bearing, a shaft is supported by a sleeve via lubricating oil, whereby noise reduction is achieved.

JP-A 2005-155912 discloses a technique for causing the lubricating oil used in the fluid dynamic bearing to sequentially flow along an inner circumferential surface, a lower surface, an outer circumferential surface, and an upper surface of a sleeve. In addition, an inner tapered seal portion is provided between a cover member placed above the sleeve and an outer circumferential surface of a shaft, while an outer tapered seal portion is provided between a sleeve housing covering the outer circumferential surface of the sleeve and an outer circumferential surface of the cover member.

In a bearing mechanism as described in JP-A 2005-155912, the lubricating oil is retained by the tapered seal portions at two locations. However, a large resistance in a channel between these tapered seal portions might lead to an excessive rise of a liquid/gas interface in the outer tapered seal portion, resulting in overflow of the lubricating oil, or an excessive lowering of a liquid/gas interface in the inner tapered seal portion, resulting in depletion of the lubricating oil.

SUMMARY OF THE INVENTION

A fluid dynamic bearing according to a preferred embodiment of the present invention includes a substantially cylindrical sleeve centered about a central axis, the central axis extending in an upward/downward direction; and a shaft inserted in the sleeve to be opposed to an inner circumferential surface of the sleeve with a radial gap therebetween.

A first capillary seal portion is preferably arranged radially outward of the radial gap to define a gap extending in an axial direction and connected to the radial gap. A second capillary seal portion is arranged above the radial gap to define a gap extending in the axial direction and connected to the radial gap and the first capillary seal portion.

The radial gap, the first capillary seal portion, and the second capillary seal portion are continuously filled with lubricating oil.

The fluid dynamic bearing preferably includes a first channel arranged to connect a bottom portion of the radial gap with the first capillary seal portion, and a second channel arranged to connect the first capillary seal portion with the second capillary seal portion and having a channel cross-sectional area larger than that of the first channel. The first channel and the second channel are filled with the lubricating oil.

A fluid dynamic bearing according to another preferred embodiment of the present invention includes a substantially cylindrical sleeve centered about a central axis, the central axis extending in an upward/downward direction; and a shaft inserted in the sleeve to be opposed to an inner circumferential surface of the sleeve with a radial gap defined therebetween.

A first capillary seal portion is arranged radially outward of the radial gap to form a gap extending in a axial direction and connected to the radial gap. A second capillary seal portion is arranged above the radial gap to define a gap extending in the axial direction and connected to the radial gap and the first capillary seal portion.

The radial gap, the first capillary seal portion, and the second capillary seal portion are continuously filled with the lubricating oil.

The fluid dynamic bearing preferably includes a first channel arranged to connect a bottom portion of the radial gap with the first capillary seal portion, and a second channel arranged to connect the first capillary seal portion with the second capillary seal portion and having a channel resistance lower than that of the first channel. The first channel and the second channel are filled with the lubricating oil.

A fluid dynamic bearing according to yet another preferred embodiment of the present invention includes a substantially cylindrical sleeve centered about a central axis, the central axis extending in an upward/downward direction; a shaft inserted in the sleeve to be opposed to an inner circumferential surface of the sleeve with a radial gap therebetween; and an annular member. The annular member preferably includes an opening arranged to have the shaft inserted therein; a top portion substantially annular and arranged to cover an upper surface of the sleeve; and a side portion extending downward from an outer circumferential portion of the top portion to cover an outer circumferential surface of the sleeve.

A capillary seal portion is arranged above the radial gap to define a gap extending in an axial direction and connected to the radial gap.

The radial gap and the capillary seal portion are filled continuously with lubricating oil.

A radial dynamic pressure bearing portion is formed in the radial gap during rotation to generate fluid dynamic pressure in the lubricating oil retained in the radial gap via a radial dynamic pressure groove.

An outside channel is arranged radially outward of the radial gap and between the outer circumferential surface of the sleeve and an inner circumferential surface of the annular member, filled with the lubricating oil, and connected to a bottom portion of the radial gap.

An upper side channel is arranged between the upper surface of the sleeve and a lower surface of the top portion of the annular member, filled with the lubricating oil, and arranged to connect the radial gap with the outside channel.

A plurality of projections or a plurality of grooves are arranged on the lower surface of the top portion of the annular member, the plurality of projections being arranged in a circumferential direction to be centered about the central axis and in contact with the upper surface of the sleeve, the plurality of grooves being opposed to the upper surface of the sleeve and extending from an inner circumferential portion to an outer circumferential portion of the lower surface of the top portion of the annular member.

Note that terms referring to "upward", "downward", "left", "right", etc., as used in the description of the present invention to describe relative positions or directions of different members are simply used with reference to the accompanying drawings, and should not be construed as describing relative positions or directions of those members when actually installed in a device.

According to preferred embodiments of the present invention, the second channel is preferably arranged to be greater in the channel cross-sectional area than the first channel to achieve stable retention of the lubricating oil in the first capillary seal portion and the second capillary seal portion. Also, a channel between the upper surface of the sleeve and the annular member can be easily achieved.

Other features, elements, steps, characteristics and advantages of the present invention will become more apparent from the following detailed description of preferred embodiments of the present invention with reference to the attached drawings.

DETAILED DESCRIPTION OF THE PREFERRED EMBODIMENTS

Hereinafter, preferred embodiments of the present invention will be described with reference to FIGS. 1 to 31. Note that terms referring to "upward", "downward", "left", "right", etc., as used in the description of the present invention to describe relative positions or directions of different members are simply used with reference to the accompanying drawings, and should not be construed as describing relative positions or directions of those members when actually installed in a device. Furthermore, any reference to a "parallel" direction refers to both parallel and substantially parallel and any reference to a "perpendicular" direction refers to both perpendicular and substantially perpendicular.

Figure 1:
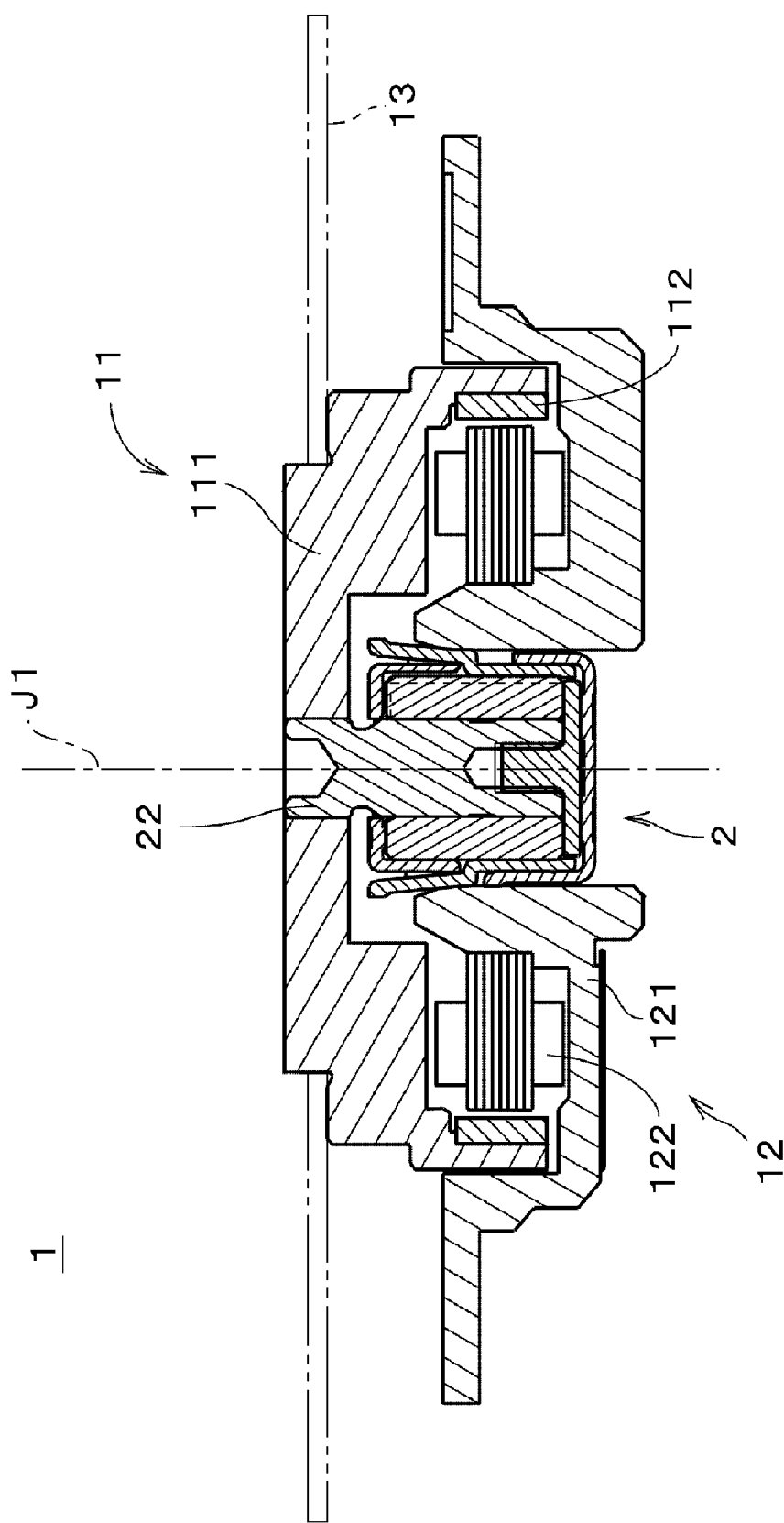
FIG. 1 is a cross-sectional view of a motor taken along a plane including a central axis.

FIG. 1 is a cross-sectional view of an outer rotor-type electric motor 1 according to a preferred embodiment of the present invention, taken along a plane including a central axis. Hereinafter, the electric motor 1 will be referred to as the "motor 1".

The motor 1 preferably includes a rotor unit 11, a stator unit 12, and a fluid dynamic bearing 2, which is arranged to support the rotor unit 11 to be rotatable with respect to the stator unit 12. Hereinafter, the fluid dynamic bearing 2 will be referred to as a "bearing mechanism 2".

The rotor unit 11 includes a rotor hub 111, which is substantially defined by a shape of a covered cylinder and to which a recording disk 13 is fixed; and a rotor magnet 112, which is attached to the rotor hub 111 and arranged around a central axis J1.

The stator unit 12 includes a base bracket 121, which is preferably a base portion having a hole portion at its center; and an armature 122, which is attached to the base bracket 121 around the hole portion. The armature 122 is arranged to produce rotational torque centered on the central axis J1 in conjunction with the rotor magnet 112, which is annular and multi-polarized. The bearing mechanism 2 is preferably secured in the hole portion of the base bracket 121 via a thermosetting adhesive.

Figure 2:
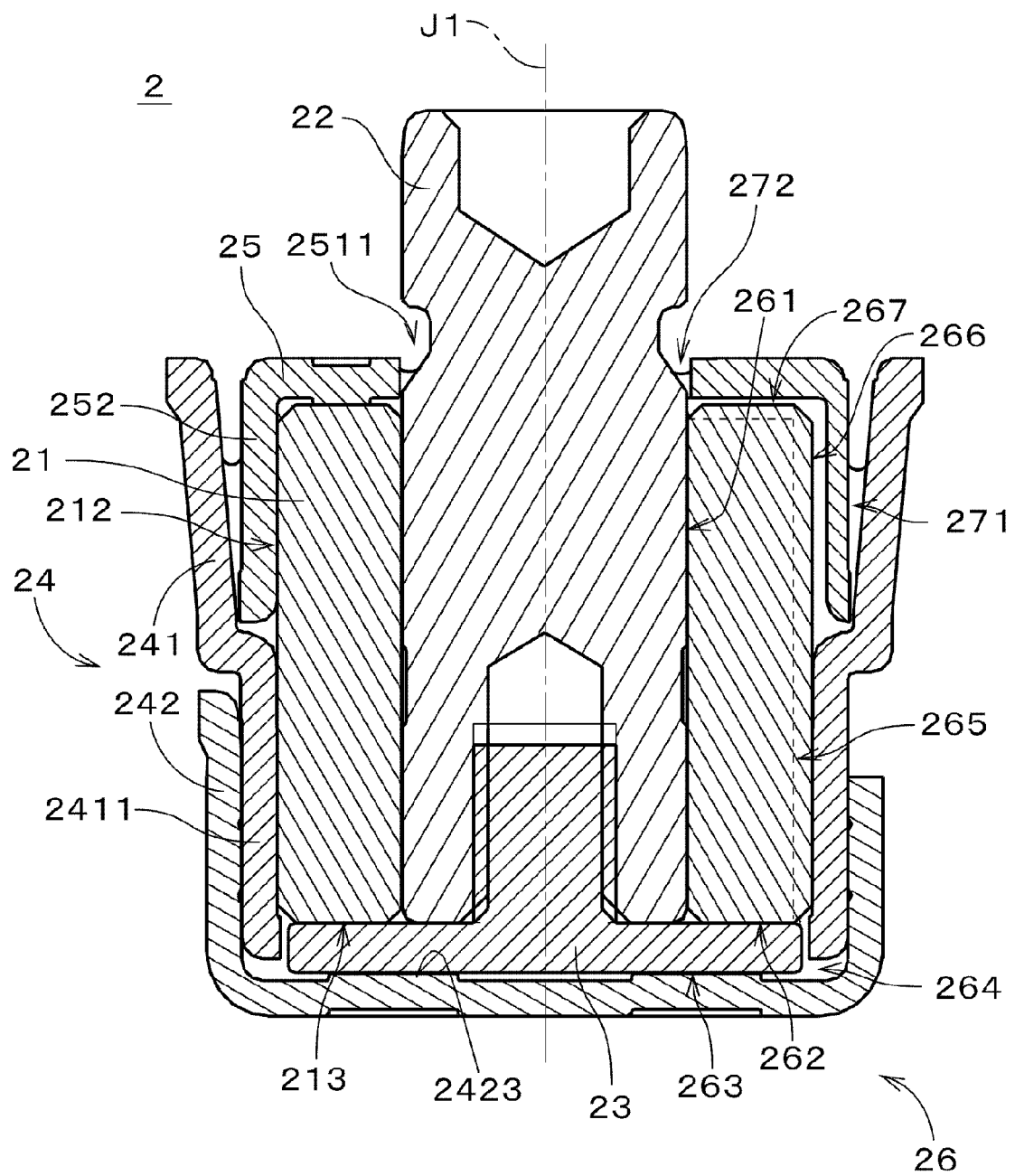
FIG. 2 is a cross-sectional view of a bearing mechanism taken along a plane including the central axis.

FIG. 2 is a cross-sectional view of the bearing mechanism 2, which utilizes fluid dynamic pressure of the motor 1, taken along a plane including the central axis.

The bearing mechanism 2 preferably includes a sleeve 21, which is substantially cylindrical; a shaft 22, which is inserted in the sleeve 21; a thrust plate 23; a sleeve housing 24; and an upper cap 25. The thrust plate 23 is preferably attached to a lower end of the shaft 22, and opposed to a lower surface of the sleeve 21 in an axial direction. The sleeve housing 24 covers a lower surface of the thrust plate 23 and an outer circumferential surface of the sleeve 21. The upper cap 25 covers an upper surface and an upper portion of the outer circumferential surface of the sleeve 21.

The sleeve housing 24 preferably includes a housing member 241, which is substantially cylindrical; and a lower cap 24, which substantially defines the shape of a cylinder with a bottom. The lower cap 24 is preferably adhered to a lower portion of an outer circumferential surface of the housing member 241.

The upper cap 25 preferably has an opening portion 2511 in which an upper end of the shaft 22, which protrudes from the sleeve 21, is inserted. As illustrated in FIG. 1, an upper end portion of the shaft 22 is secured to the rotor unit 11, whereby the rotor unit 11 is supported to be rotatable with respect to the stator unit 12.

Figure 3:
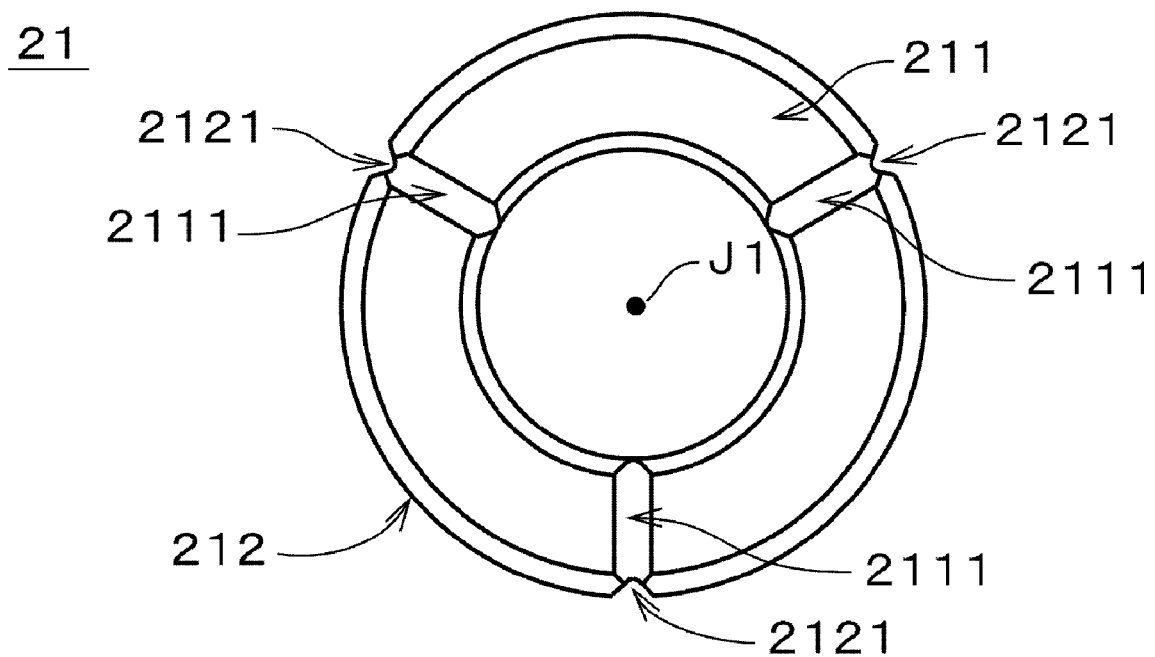
FIG. 3 is a plan view of a sleeve.
Figure 4:
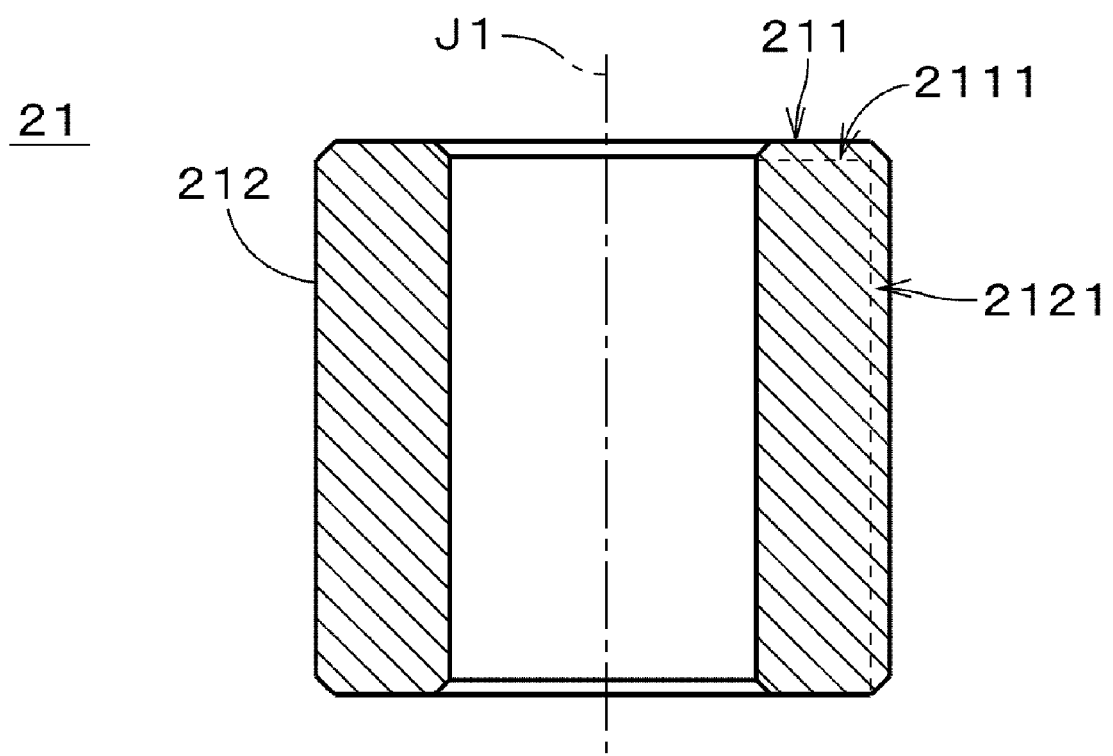
FIG. 4 is a cross-sectional view of the sleeve taken along a plane including the central axis.
Figure 5:
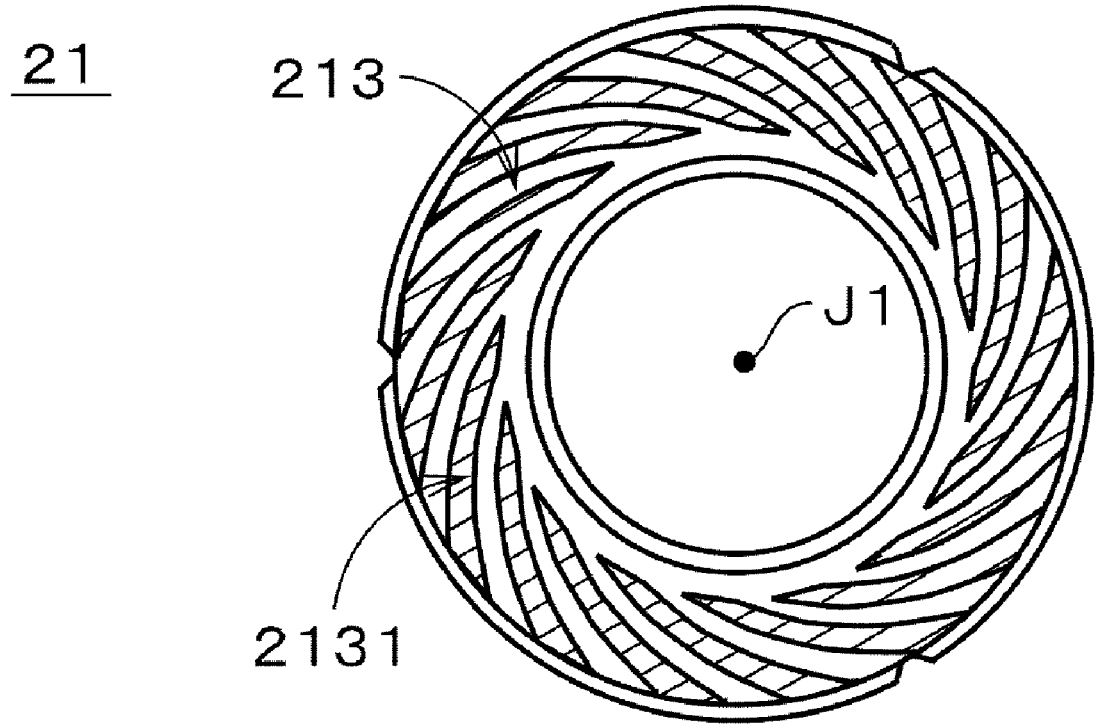
FIG. 5 is a bottom view of the sleeve.

FIGS. 3, 4, and 5 are a plan view of the sleeve 21, a cross-sectional view of the sleeve 21 taken along a plane including the central axis, and a bottom view of the sleeve 21, respectively.

The sleeve 21 preferably has a plurality of upper surface grooves 2111 provided on an upper surface 211 thereof; on an outer circumferential surface 212 thereof, a plurality of outer circumferential surface grooves 2121 extending in a direction parallel to the central axis J1; and on a lower surface 213 thereof, spiral thrust dynamic pressure grooves 2131 (indicated by parallel oblique lines).

The plurality of upper surface grooves 2111 extend from an inner circumference to an outer circumference of the sleeve on the upper surface thereof. The plurality of outer circumferential surface grooves 2121 extend in a direction substantially parallel to the central axis J1.

The upper surface grooves 2111 are situated at three positions that are preferably substantially equally spaced from one another in a circumferential direction. The outer circumferential surface grooves 2121 are preferably arranged at the same circumferential positions as the upper surface grooves 2111. The depth of the upper surface grooves 2111 is less than the axial widths of a chamfer provided at an outer edge of the upper surface 211 and a chamfer provided at an inner edge of the upper surface 211. In addition, the depth of the outer circumferential surface grooves 2121 is less than the radial width of the chamfer at the outer edge of the upper surface 211. The sleeve 21 is preferably made of porous sintered metal. The upper surface grooves 2111, the outer circumferential surface grooves 2121, and the thrust dynamic pressure grooves 2131 are preferably formed at the time of molding the sleeve 21.

Figure 6:
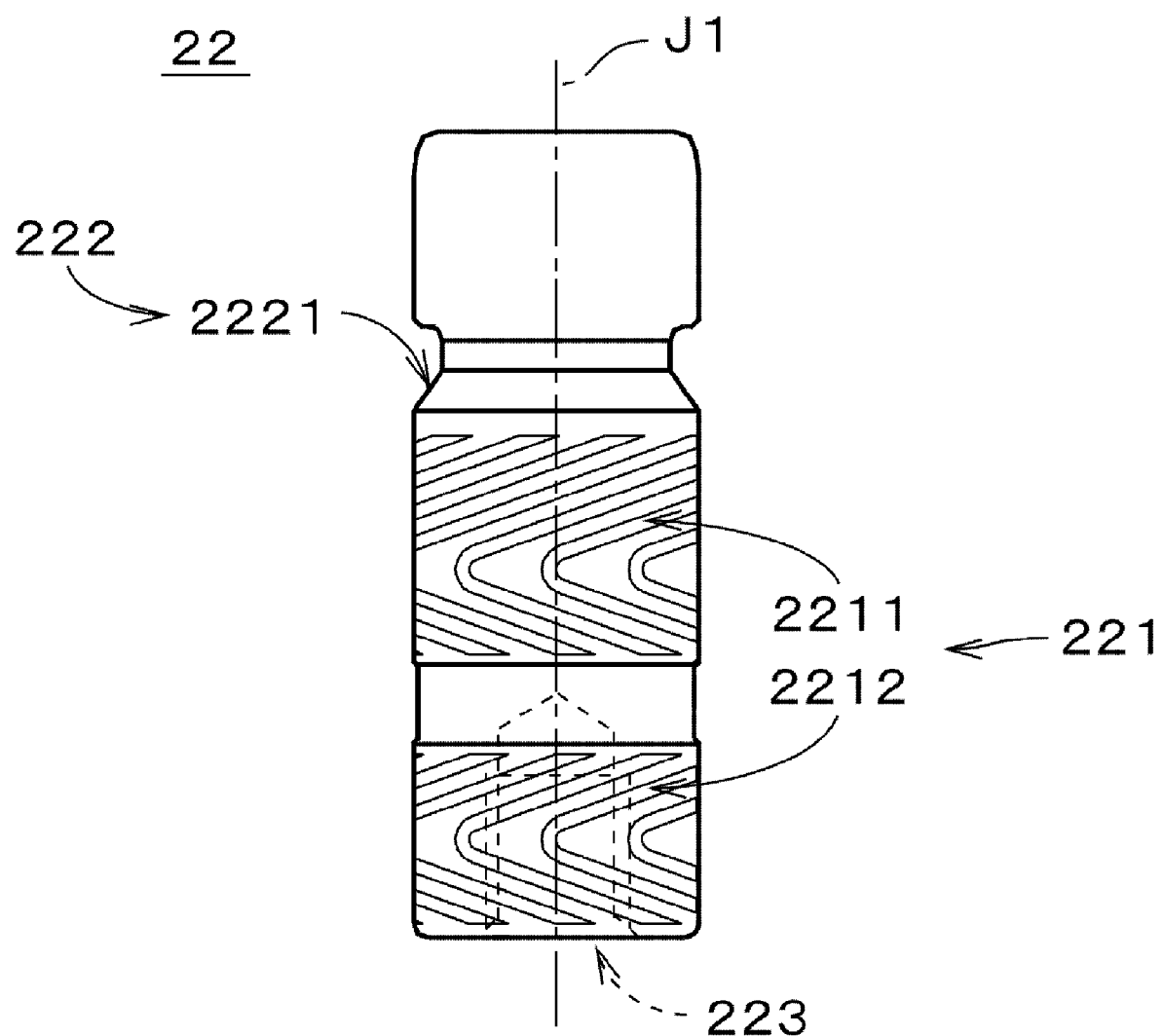
FIG. 6 is a front view of a shaft.

FIG. 6 is a front view of the shaft 22. The shaft 22 preferably includes radial dynamic pressure grooves 221, an annular recessed portion 222, and a female screw 223. The radial dynamic pressure grooves 221 are defined on an outer circumferential surface of the shaft 22. The annular recessed portion 222 is positioned above the radial dynamic pressure grooves 221. The female screw 223 is arranged to axially extend from a lower end surface of the shaft 22.

The radial dynamic pressure grooves 221 are arranged at two locations that are axially spaced apart from each other. When the shaft 22 is rotated, the radial dynamic pressure grooves 221 are arranged to produce radial dynamic pressure in a radial gap 261 (see FIG. 2) defined between the shaft 22 and an inner circumferential surface of the sleeve 21, resulting in formation of a radial dynamic pressure bearing portion. The radial dynamic pressure bearing portion allows the shaft 22 to be radially supported by the sleeve 21 via the lubricating oil in a non-contacting manner.

Both an upper groove 2211 and a lower groove 2212 of the radial dynamic pressure grooves 221 are defined by a herringbone pattern. Note that the upper groove 2211 and the lower groove 2212 represent an aggregate of grooves with the herringbone pattern.

Within the upper groove 2211, groove portions positioned above return portions are longer than groove portions below them, and accordingly, dynamic pressure that causes the lubricating oil to flow downward within the radial gap 261 is produced along with the radial dynamic pressure.

Within the lower groove 2212, groove portions have an equal length on upper and lower sides, and serve to produce the radial dynamic pressure. The annular recessed portion 222 has an inclined plane 2221 on a lower side. The inclined plane 2221 is slanted such that an outer diameter of the shaft 22 decreases gradually in an upward direction.

Figure 7:
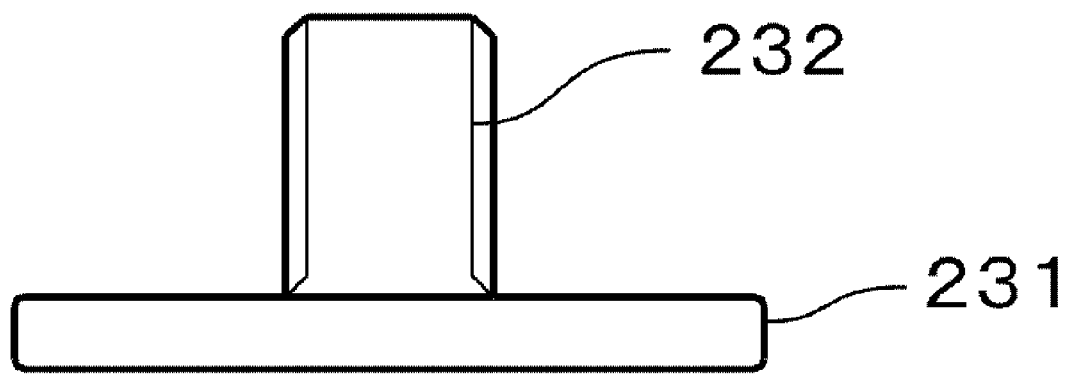
FIG. 7 is a front view of a thrust plate.
Figure 8:
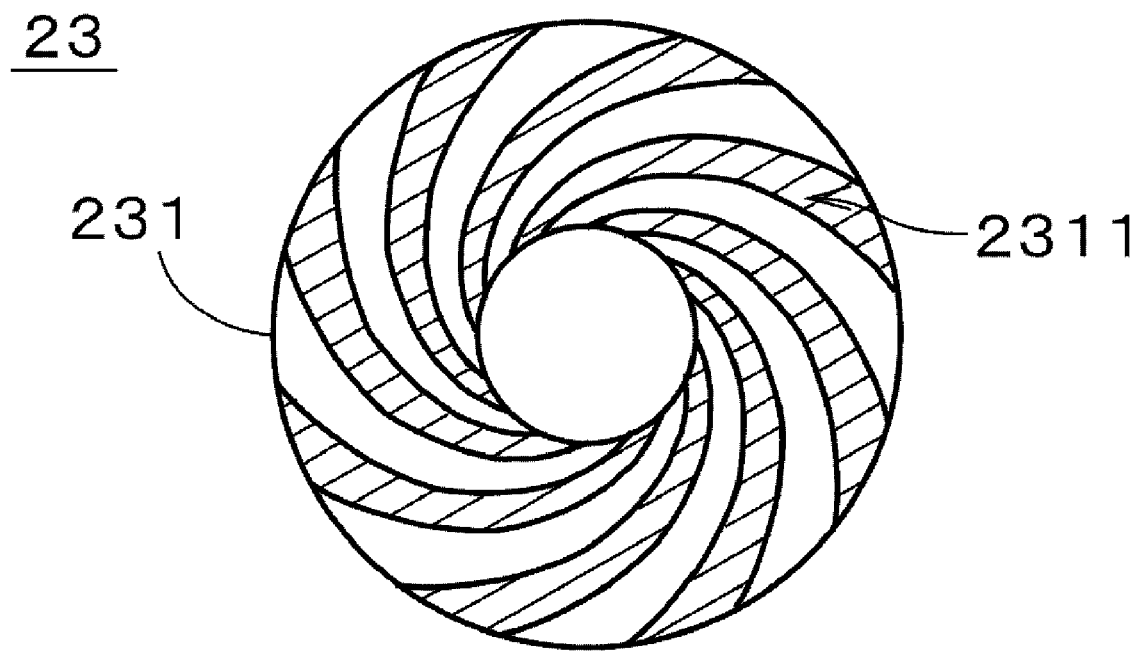
FIG. 8 is a bottom view of the thrust plate.

FIGS. 7 and 8 are a front view and a bottom view of the thrust plate 23. As illustrated in FIG. 7, the thrust plate 23 includes a plate portion 231, which is substantially disk-shaped; and a male screw 232, which protrudes upward from a center of the plate portion 231.

The thrust plate 23 is screwed into the female screw 223 of the shaft 22 (see FIG. 6) to be secured to a lower end portion of the shaft 22. In addition, as illustrated in FIG. 8, the plate portion 231 has provided on a lower surface thereof spiral thrust dynamic pressure grooves 2311 (indicated by parallel oblique lines).

As illustrated in FIG. 2, when the shaft 22 and the thrust plate 23 are rotated, the lubricating oil is caused to flow from the radial gap 261 into a first thrust gap 262 defined between the lower surface 213 of the sleeve 21 and an upper surface of the thrust plate 23. The first thrust gap 262 is filled with the lubricating oil.

In the first thrust gap 262, thrust dynamic pressure is produced by the thrust dynamic pressure grooves 2131 (see FIG. 5) on the lower surface 213, resulting in formation of a first thrust dynamic pressure bearing portion. A second thrust gap 263 defined between the thrust plate 23 and the lower cap 242 is also filled with the lubricating oil. In the second thrust gap 263, the thrust dynamic pressure is produced by the thrust dynamic pressure grooves 2311 (see FIG. 8) on the lower surface of the thrust plate 23, resulting in formation of a second thrust dynamic pressure bearing portion.

The shaft 22 is supported in a thrust direction by the first thrust dynamic pressure bearing portion and the second thrust dynamic pressure bearing portion. In addition, a gap 264 that couples the first thrust gap 262 with the second thrust gap 263 is defined between an outer circumferential surface of the thrust plate 23 and an inner circumferential surface and an inner bottom surface of the sleeve housing 24. The gap 264 is filled with the lubricating oil.

Figure 9:
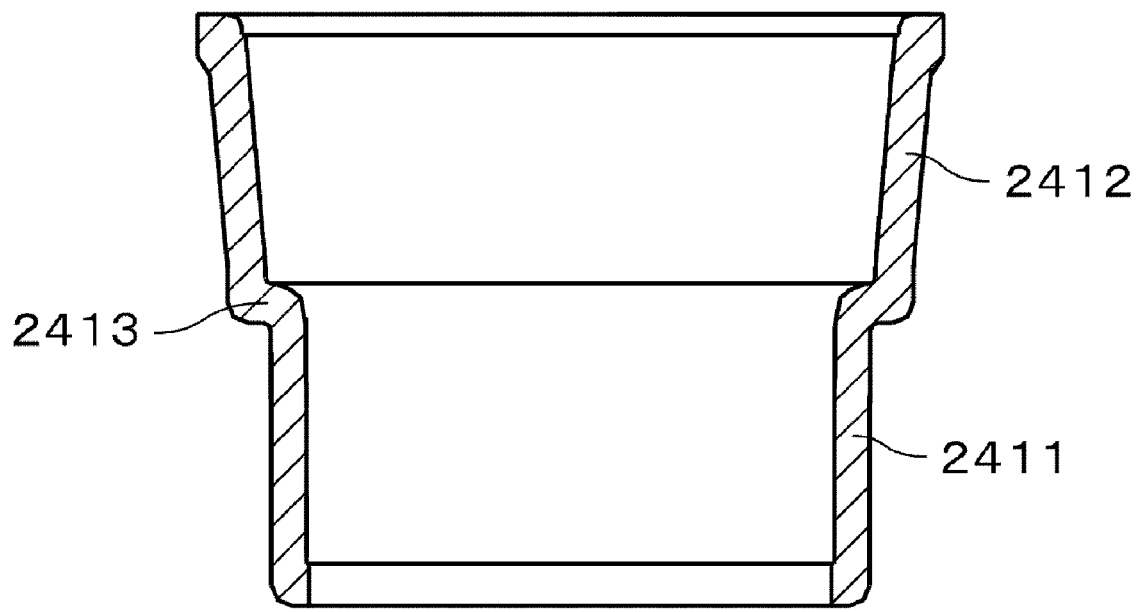
FIG. 9 is a cross-sectional view of a housing member taken along a plane including the central axis.

FIG. 9 is a cross-sectional view of the substantially cylindrical housing member 241 of the sleeve housing 24 taken along a plane including the central axis. A cylindrical portion 2411 is provided in a lower portion of the housing member 241, while in an upper portion thereof, an annular inclined portion 2412, whose diameter increases gradually in the upward direction, is provided. An inside diameter of a lower end portion of the annular inclined portion 2412 is greater than an inside diameter of the cylindrical portion 2411, and a shoulder portion 2413 is defined between the cylindrical portion 2411 and the annular inclined portion 2412.

Figure 10:
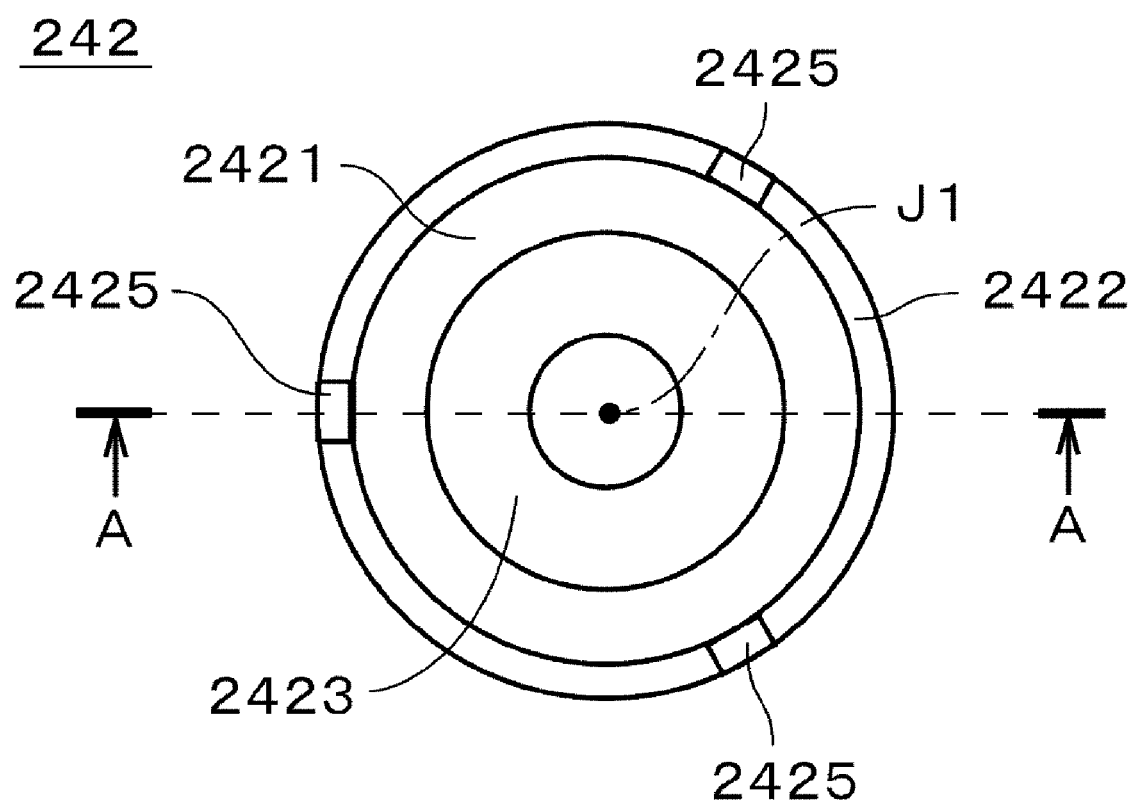
FIG. 10 is a plan view of a lower cap.
Figure 11:
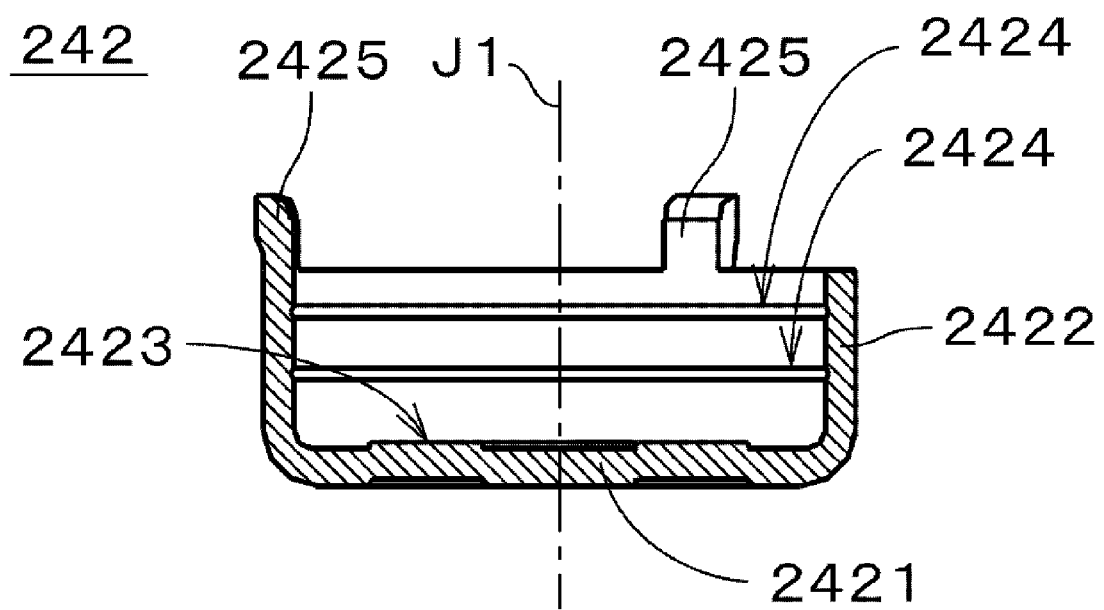
FIG. 11 is a cross-sectional view of the lower cap taken along a plane including the central axis.

FIG. 10 is a plan view of the lower cap 242 of the sleeve housing 24. FIG. 11 is a cross-sectional view of the lower cap 242 taken as indicated by arrows A in FIG. 10.

The lower cap 242 preferably has a bottom portion 2421, which is substantially disk-shaped, and a side portion 2422, which is substantially cylindrical. The lower cap 242 is fit onto the cylindrical portion 2411 of the housing member 241 from below, and preferably secured thereto via an adhesive, for example.

The bottom portion 2421 is annular, with the central axis J1 at its center, and has a raised portion 2423, which slightly projects upward. As illustrated in FIG. 2, the raised portion 2423 serves to locally narrow the gap defined in relation to the lower surface of the thrust plate 23. The raised portion 2423 contributes to increasing the thrust dynamic pressure in the second thrust gap 263.

As illustrated in FIG. 11, narrow grooves 2424 which extend circumferentially and are arranged to retain the adhesive are provided on an inner circumferential surface of the side portion 2422. The grooves 424 are provided at two locations that are axially spaced apart from each other. Three claw portions 2425, which protrude upward, are provided on an upper edge of the side portion 2422 to be equally spaced from one another in the circumferential direction. However, it should be noted that any desirable number of claw portions 2425 could be used.

As illustrated in FIG. 2, the sleeve 21 is preferably press fitted, for example, onto an inner circumferential surface of the cylindrical portion 2411 of the housing member 241 to be secured thereto.

Because of the outer circumferential surface grooves 2121 of the sleeve 21 (see FIG. 3), a channel 265 where the lubricating oil from the first thrust gap 262 flows upward is defined between the outer circumferential surface of the sleeve 21 and the inner circumferential surface of the cylindrical portion 2411. Hereinafter, the channel 265 will be referred to as an "outside lower channel 265".

Figure 12:
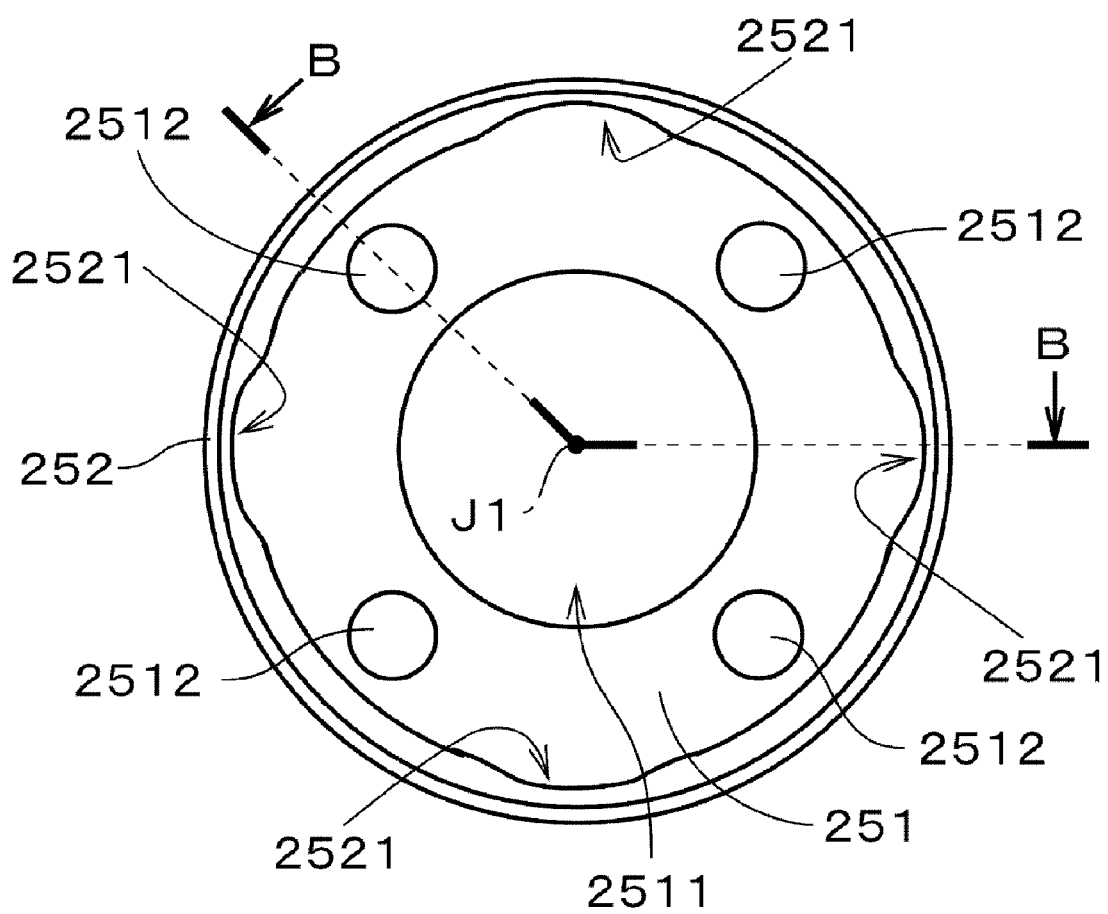
FIG. 12 is a bottom view of an upper cap.
Figure 13:
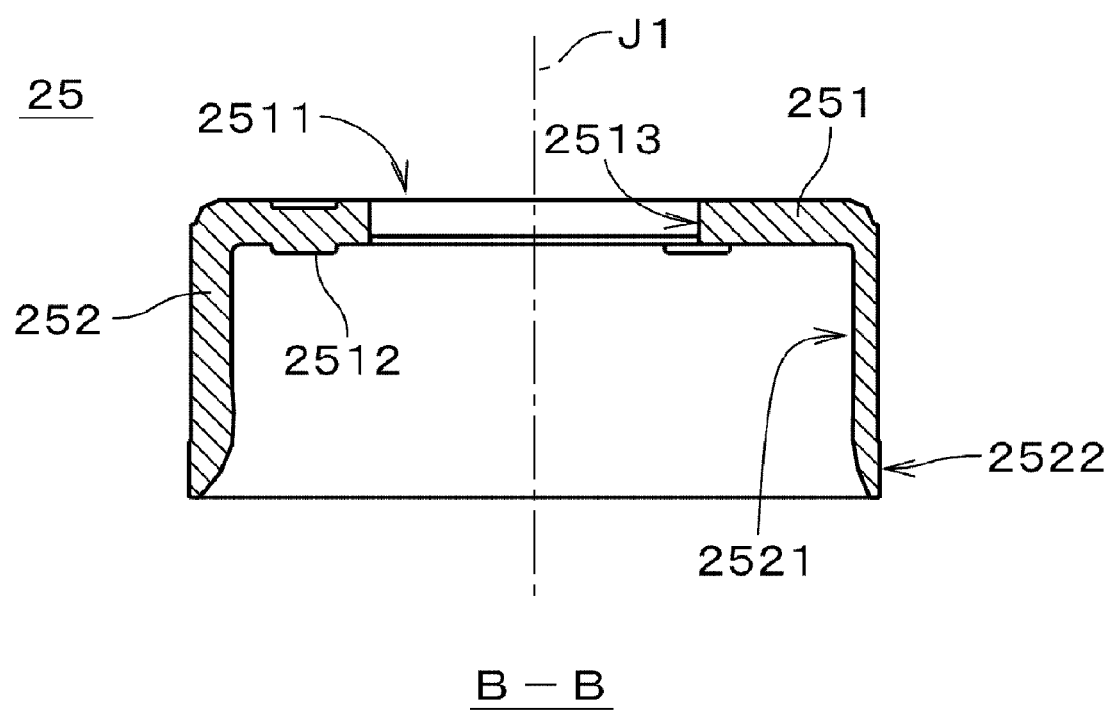
FIG. 13 is a cross-sectional view of the upper cap taken along a plane including the central axis.

FIG. 12 is a bottom view of the upper cap 25, which is substantially defined by shape of a covered cylinder. FIG. 13 is a cross-sectional view of the upper cap 25 taken as indicated by arrows B in FIG. 12.

The upper cap 25 preferably includes a top portion 251, which is substantially annular and flat, and a cylindrical portion 252, which extends downward from an outer circumferential portion of the top portion 251. As illustrated in FIG. 2, the shaft 22 is inserted in the central circular opening portion 2511, and an upper portion of the sleeve 21 is preferably press fitted, for example, onto the cylindrical portion 252. An inside diameter of the opening portion 2511 is larger than the outer diameter of the shaft 22, and as illustrated in FIG. 13, an inner circumferential surface 2513 of the opening portion 2511 defines a cylindrical surface that extends parallel to the central axis J1.

Figure 14:
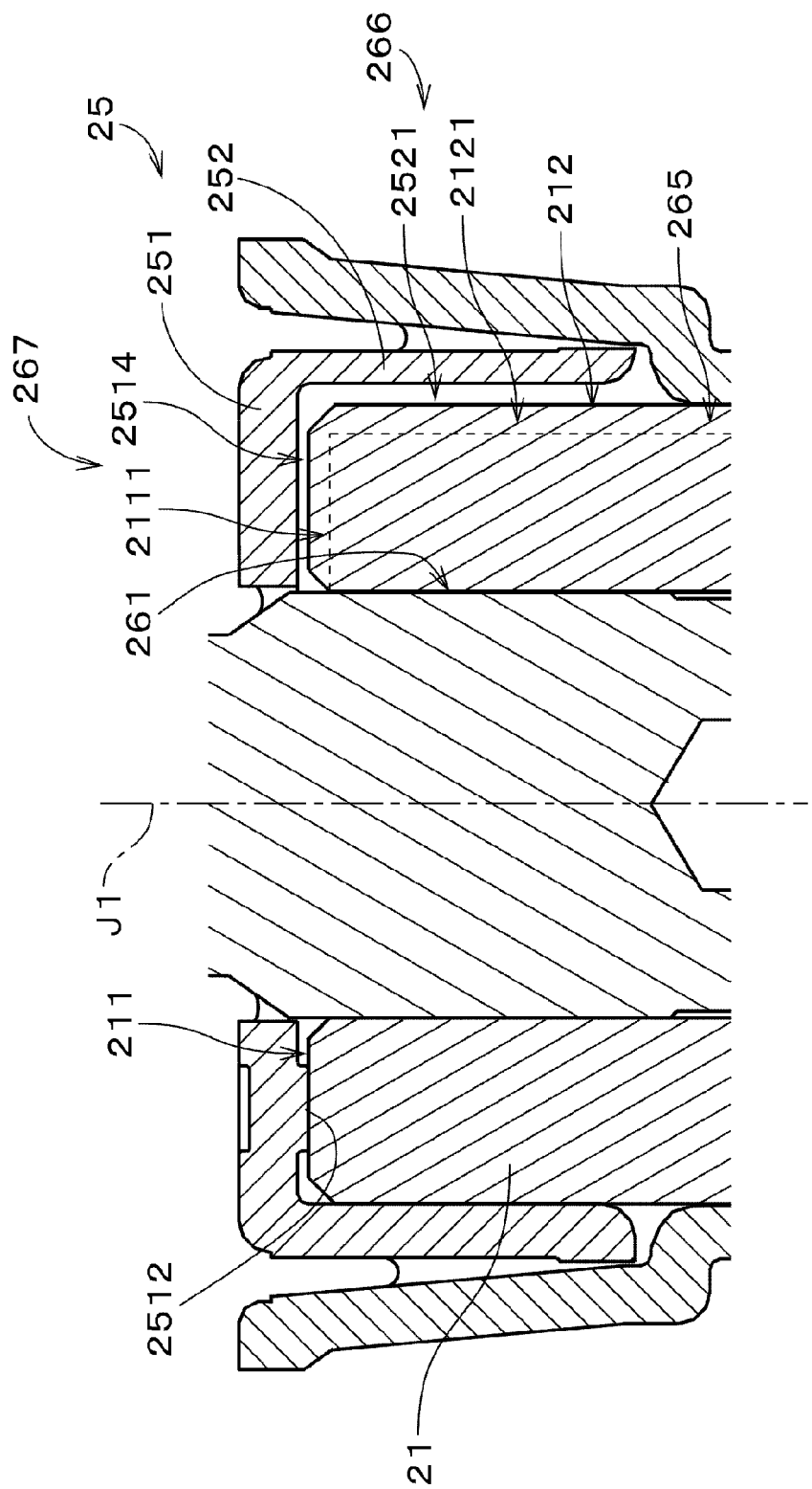
FIG. 14 is an enlarged view of an upper portion of the bearing mechanism.

FIG. 14 is an enlarged view of an upper portion of the bearing mechanism 2. As illustrated in FIGS. 12 to 14, four raised portions 2512, which are defined by circular projections, are provided on a lower surface of the top portion 251 of the upper cap 25 to be substantially equally spaced from one another in the circumferential direction. As illustrated in FIG. 14, the raised portions 2512 are in contact with the upper surface 211 of the sleeve 21. Note that the raised portions 2512 are preferably formed by half blanking when the upper cap 25 is produced by press working, for example.

As illustrated in FIGS. 12 and 13, four recessed portions 2521, which extend from a lower end portion of the cylindrical portion 252 to the lower surface of the top portion 251 in parallel with the central axis J1, are provided on an inner circumferential surface of the cylindrical portion 252 so as to be substantially equally spaced from one another in the circumferential direction. Each of the recessed portions 2521 is positioned in substantially the middle of a pair of neighboring raised portions 2512 in the circumferential direction. In other words, circumferential positions of portions between the raised portions 2512 substantially coincide with those of the recessed portions 2521.

The circumferential width of the raised portion 2512 of the top portion 251 is greater than the circumferential width of the upper surface groove 2111 of the sleeve 21 as illustrated in FIG. 3. This contributes to preventing the raised portion 2512 from falling into the upper surface groove 2111.

The recessed portions 2521 are preferably defined by grooves that are opposed to the outer circumferential surface 212 of the sleeve 21. The circumferential width of a portion between neighboring recessed portions 2521 is preferably greater than the width of the outer circumferential surface groove 2121 of the sleeve 21 as illustrated in FIG. 3. This contributes to preventing the portion between the recessed portions 2521 from falling into the outer circumferential surface groove 2121.

As illustrated in FIG. 14, between the outer circumferential surface 212 of the sleeve 21 and the inner circumferential surface of the cylindrical portion 252 of the upper cap 25, an outside upper channel 266 is defined by the outer circumferential surface grooves 2121 of the sleeve 21 and the recessed portions 2521 on the inner circumferential surface of the upper cap 25.

In addition, between the upper surface 211 of the sleeve 21 and the lower surface of the top portion 251 of the upper cap 25, an upper side channel 267 is defined by the upper surface grooves 2111 of the sleeve 21 and a gap 2514, which is defined by the contact of the raised portions 2512 of the upper cap 25 with the upper surface 211 of the sleeve 21.

The lubricating oil flows from the outside lower channel 265 into the outside upper channel 266, then flows upward into the upper side channel 267, and then flows into the radial gap 261.

As illustrated in FIG. 13, the upper cap 25 is preferably produced by subjecting a plate to press working and stamping. On an outer circumferential surface of the lower end portion of the cylindrical portion 252 a cut surface 2522 is provided, which is preferably formed when the upper cap 25 is produced. A diameter of the cut surface 2522, which is substantially cylindrical and parallel to the central axis J1, is slightly greater than an outer diameter of that portion of the cylindrical portion 252 which is positioned above the cut surface 2522.

As illustrated in FIG. 2, during the rotation of the motor 1, the radial gap 261, the first thrust gap 262, the outside lower channel 265, the outside upper channel 266, and the upper side channel 267 combine to define a circulation path 26 within the bearing mechanism 2.

The circulation path 26 is filled continuously with the lubricating oil, and the fluid dynamic pressure is caused by the rotation of the shaft 22, so that the lubricating oil flows through the first thrust gap 262, which is connected to a bottom portion of the radial gap 261, to the outside lower channel 265 and the outside upper channel 266 on the outer circumferential surface 212 of the sleeve 21, and then flows through an upper edge of the outer circumferential surface 212 and the upper side channel 267 to a top portion of the radial gap 261.

On the other hand, outside of the upper cap 25, a first tapered seal portion 271, which defines a first capillary seal portion, is provided, whereas inside the upper cap 25, a second tapered seal portion 272, which defines a second capillary seal portion, is provided. The lubricating oil is retained in the first tapered seal portion 271 and the second tapered seal portion 272.

Figure 15:
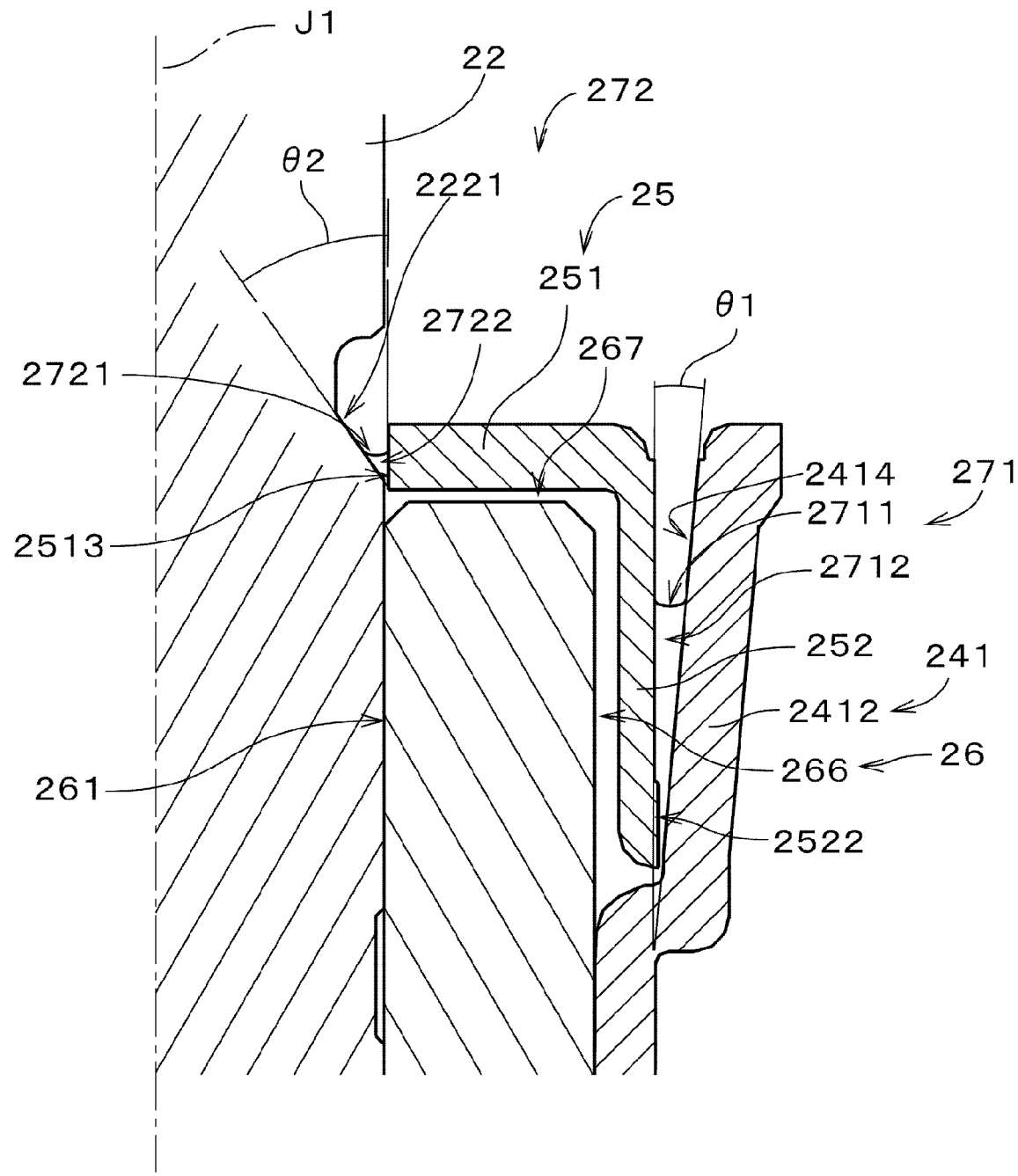
FIG. 15 is a diagram illustrating the structures of tapered seal portions.

FIG. 15 is an enlarged view of the first tapered seal portion 271 and the second tapered seal portion 272.

The first tapered seal portion 271 is arranged in a sloping gap 2712. The sloping gap 2712 is defined by a gap between an inner circumferential surface 2414 of the annular inclined portion 2412 of the housing member 241 and an outer circumferential surface of the cylindrical portion 252 of the upper cap 25, which is positioned inward of the annular inclined portion 2412. Hereinafter, the sloping gap 2712 will be referred to as a "first sloping gap 2712".

The first sloping gap 2712 gradually expands upwardly, and in FIG. 15, a slope angle of the first sloping gap 2712 is denoted by symbol θ1. In the first tapered seal portion 271, downward capillary force is caused by the first sloping gap 2712, so that the lubricating oil is retained in the first tapered seal portion 271. A first liquid/gas interface 2711 of the lubricating oil is defined in the first tapered seal portion 271.

Note that the axial length of the first tapered seal portion 271 is greater than the axial length of the second tapered seal portion 272.

An oil-repellent film is preferably provided at an upper portion of the first sloping gap 2712 to prevent leakage of the lubricating oil. In addition, the cut surface 2522, which is provided at a lower end of the cylindrical portion 252 of the upper cap 25, narrows a gap between a lower portion of the first tapered seal portion 271 and the circulation path 26, resulting in more stable retention of the lubricating oil.

Roughness of the cut surface 2522 also contributes to increasing the stability with which the lubricating oil is retained. As a result, even when the bearing mechanism 2 is in the last stage of its life with a reduced amount of the lubricating oil, an oil seal having the cut surface serves to prolong the life of the bearing mechanism 2.

The second tapered seal portion 272 is provided in a sloping gap 2722. The sloping gap 2722 is positioned above the radial gap 261, and is defined by a gap between the inclined plane 2221 of the shaft 22 and the inner circumferential surface 2513 of the opening portion 2511 of the top portion 251 of the upper cap 25 (see FIG. 13). Hereinafter, the sloping gap 2722 will be referred to as a "second sloping gap 2722".

The second sloping gap 2722 gradually expands upwardly, and in FIG. 15, a slope angle of the second sloping gap 2722 is denoted by symbol θ2. In the second tapered seal portion 272, downward capillary force is caused by the second sloping gap 2722, so that the lubricating oil is retained in the second tapered seal portion 272. A second liquid/gas interface 2721 of the lubricating oil is arranged in the second tapered seal portion 273. An oil-repellent film is provided at an upper side of the inclined plane 2221 of the shaft 22 and an upper surface of the upper cap 25 to prevent the leakage of the lubricating oil.

Figure 16:
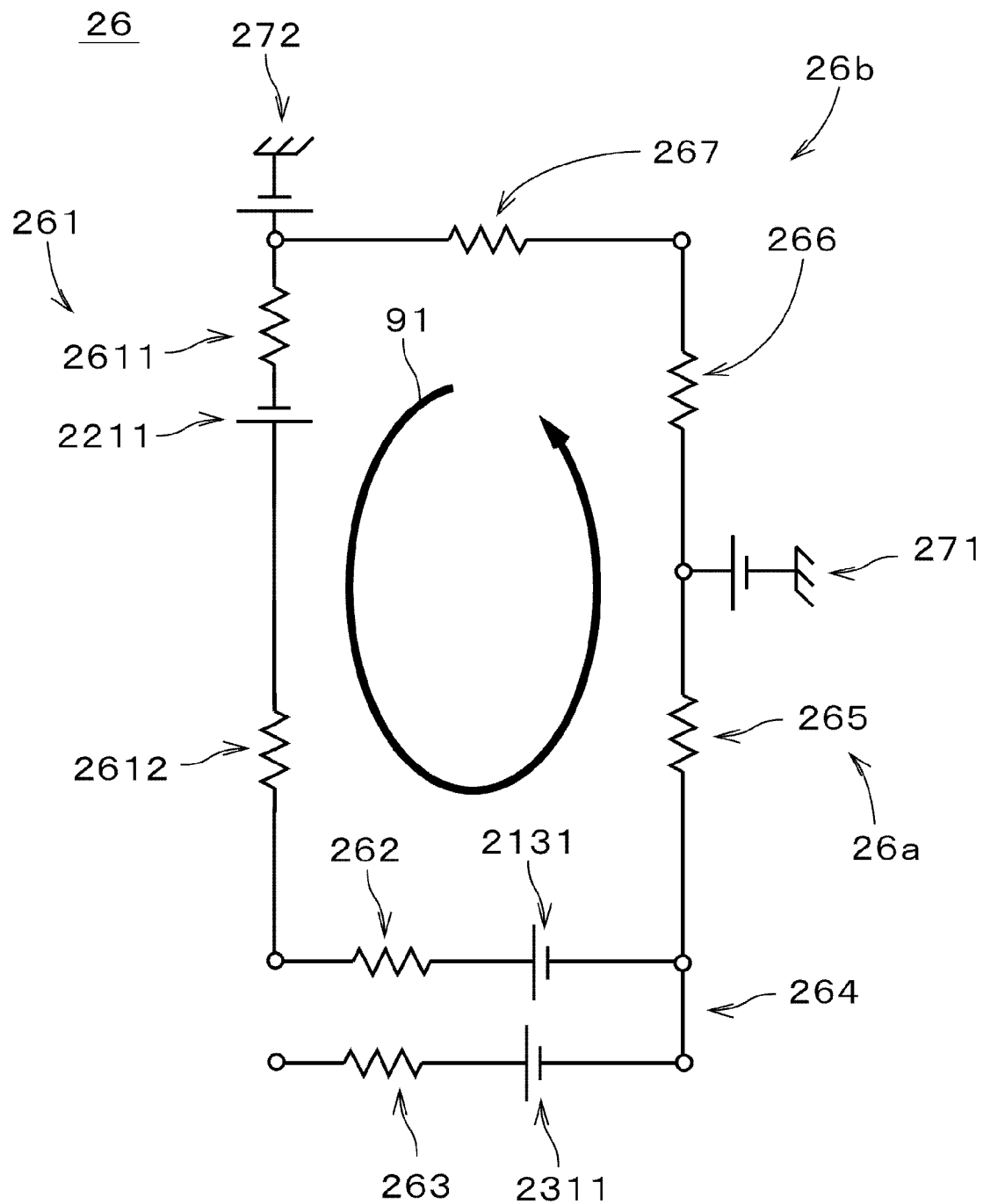
FIG. 16 is a diagram illustrating an outline of a flow circuit.

FIG. 16 is a schematic diagram representing a flow circuit of the lubricating oil in the circulation path 26 in the form of an electric circuit. In FIG. 16, a dynamic pressure generation portion, channel resistance, and a tapered seal portion are represented by a power supply, an electric resistor, and a combination of a ground and a power supply, respectively.

In the flow circuit of FIG. 16, as indicated by an arrow 91, the lubricating oil circulates in a direction of the dynamic pressure generated by the groove 2211 of the radial gap 261. In the representation, the channel resistance is divided among the radial gap 261, the first thrust gap 262, the second thrust gap 263, the outside lower channel 265, the outside upper channel 266, and the upper side channel 267. Further, the radial gap 261 includes an upper radial gap 2611 close to the groove 2211 and a lower radial gap 2612 close to the groove 2212 (see FIG. 6). While the groove 2211 and the upper radial gap 2611 are at substantially the same axial position in structural terms, they are shown in FIG. 16 as being connected in series.

In the circulation path 26, the thrust dynamic pressure grooves 2131, which are provided on the lower surface 213 of the sleeve 21, and the thrust dynamic pressure grooves 2311, which are provided on the lower surface of the thrust plate 23, also generate the dynamic pressure. While the direction of the thrust dynamic pressure generated by the thrust dynamic pressure grooves 2131 is opposite to that of the dynamic pressure generated by the groove 2211, the lubricating oil flows in the direction as indicated by the arrow 91 because the pressure generated by the groove 2211 is the greater of the two. In practice, the dynamic pressures generated by the thrust dynamic pressure grooves 2311 are balanced between both sides of the central axis, and therefore, the flow of the lubricating oil is not caused thereby.

Next, relationships among the channel resistances in the outside lower channel 265, the outside upper channel 266, and the upper side channel 267 will be described below.

Suppose that the resistances in the outside upper channel 266 and the upper side channel 267 are greater than the channel resistance in the outside lower channel 265. In this case, the lubricating oil flowing from the outside lower channel 265 would not be accepted by the outside upper channel 266 and the upper side channel 267, resulting in a flow of the lubricating oil into the first tapered seal portion 271.

This might cause a rise of the level of the first liquid/gas interface 2711 in the first tapered seal portion 271 (see FIG. 15), resulting in the leakage of the lubricating oil, and causing shortage of the lubricating oil in the second tapered seal portion 272, resulting in a fall of the level of the second liquid/gas interface 2721 (see FIG. 15) and intrusion of air bubbles.

Here, as illustrated in FIG. 16, a first channel 26a includes the outside lower channel 265. The first channel 26a is connected to the first thrust gap and the first tapered seal portion 271. A second channel 26b includes the outside upper channel 266 and the upper side channel 267. The second channel 26b is connected to the first tapered seal portion 271, the second tapered seal portion 272, and the radial gap 261.

The outside lower channel 265 is defined by the inner circumferential surface of the sleeve housing 24 and the outer circumferential surface of the sleeve 21. The outside upper channel 266 is defined by the lower surface of the top portion of and the inner circumferential surface of the upper cap 25 and the upper surface 211 and the outer circumferential surface 212 of the sleeve 21.

In the relationships among the aforementioned channel resistances, the channel resistance in the second channel 26b is lower than the channel resistance in the first channel 26a. This allows the circulation of the lubricating oil while maintaining the stability of the retention of the lubricating oil by the first and second tapered seal portions 271 and 272.

As noted previously, the outside lower channel 265 is defined by the outer circumferential surface grooves 2121 of the sleeve 21 (see FIG. 3). The outside upper channel 266 is defined by the outer circumferential surface grooves 2121 of the sleeve 21 and the recessed portions 2521 of the upper cap 25 (see FIG. 12).

Because of the recessed portions 2521, a channel cross-sectional area of the outside upper channel 266 is sufficiently larger than a channel cross-sectional area of the outside lower channel 265. Note that the channel cross-sectional area refers to an area of a cross-section perpendicular to the direction of the flow of the lubricating oil, or a gross area of a channel cross-section perpendicular to the central axis.

Thus, a reduction in the resistance in the outside upper channel 266 is achieved easily. Meanwhile, the upper side channel 267 is defined by the upper surface grooves 2111 of the sleeve 21 (see FIG. 3) and the gap 2514 between the upper surface 211 of the sleeve 21 and the lower surface of the top portion 251 of the upper cap 25. The axial height of the raised portions 2512 is arranged to allow the channel cross-sectional area of the upper side channel 267 to be sufficiently larger than the channel cross-sectional area of the outside lower channel 265. This allows a reduction in the resistance in the upper side channel 267 to be achieved easily.

As a result, a total channel resistance in the second channel 26b is made lower than the channel resistance in the first channel 26a. This contributes to preventing an increase in pressure inside the first tapered seal portion 271 and a resulting rise of the first liquid/gas interface 2711 in the first tapered seal portion 271, and a fall of the second liquid/gas interface 2721 in the second tapered seal portion 272 and a resulting intrusion of the air bubbles into the bearing mechanism 2. This allows stable circulation of the lubricating oil in the circulation path 26.

In addition, since the raised portions 2512 on the lower surface of the top portion 251 of the upper cap 25 are positioned in the middle of the recessed portions 2521 of the cylindrical portion 252, circumferential positions of the second channel 26b correspond substantially between the outer circumferential surface 212 of the sleeve 21 and the upper surface 211 of the sleeve 21, resulting in an additional reduction in the channel resistance in the second channel 26b.

Not only the channel cross-sectional area but also the length of the channel affects the channel resistance. In the case of a small motor, however, the channel cross-sectional area of the first channel 26a is very small, and an increase in the channel cross-sectional area causes a significant decrease in the channel resistance. Therefore, the channel resistance in the second channel 26b can generally be made lower than that in the first channel 26a by making the channel cross-sectional area of the second channel 26b larger than the channel cross-sectional area of the first channel 26a.

In the bearing mechanism 2, the slope angle θ1 of the first tapered seal portion 271 as illustrated in FIG. 15 is preferably 5 degrees, and the slope angle θ2 of the second tapered seal portion 272 is preferably about 34 degrees, and θ2 is preferably greater than θ1.

This allows the pressure applied to the lubricating oil in the first tapered seal portion 271 to be constantly greater than the pressure applied to the lubricating oil in the second tapered seal portion 272. This contributes to reducing an influence of the resistance in the second channel 26b on the liquid/gas interface in the first tapered seal portion 271.

As described above, the stable retention of the lubricating oil in the first tapered seal portion 271 and the second tapered seal portion 272 is achieved by making the channel cross-sectional area of the second channel 26b larger than that of the first channel 26a, and thereby reducing the channel resistance in the second channel 2b.

In addition, the stability of the retention of the lubricating oil in the first tapered seal portion 271 and the second tapered seal portion 272 can be further increased by making the pressure applied by the first tapered seal portion 271 onto the lubricating oil greater than that applied by the second tapered seal portion 272.

Furthermore, an arrangement of the first channel 26a can be easily achieved by an arrangement of the sleeve housing 24, and an arrangement of the second channel 26b can be easily achieved by an arrangement of the raised portions 2512 and the recessed portions 2521 of the upper cap 25.

Figure 17:
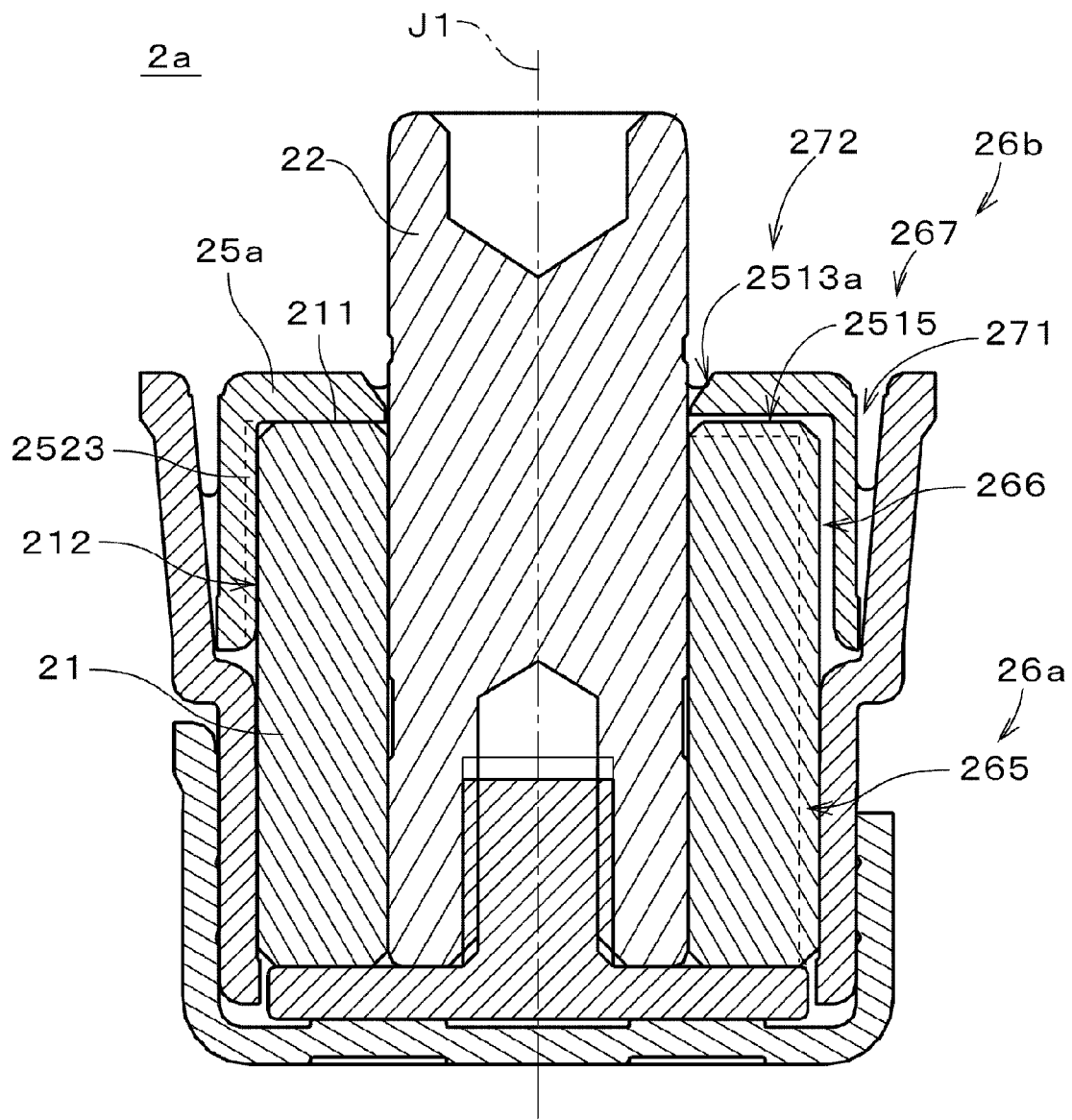
FIG. 17 is a cross-sectional view of a bearing mechanism according to another preferred embodiment, taken along a plane including a central axis.

FIG. 17 is a cross-sectional view of a bearing mechanism for use in the motor 1 as illustrated in FIG. 1 according to another preferred embodiment of the present invention, taken along a plane including a central axis. A bearing mechanism 2a as illustrated in FIG. 17 is identical to the bearing mechanism 2 as illustrated in FIG. 2 except that the annular recessed portion 222 of the shaft 22 is absent, and that the shape of the upper cap 25 is different from an upper cap 25a.

Figure 18:
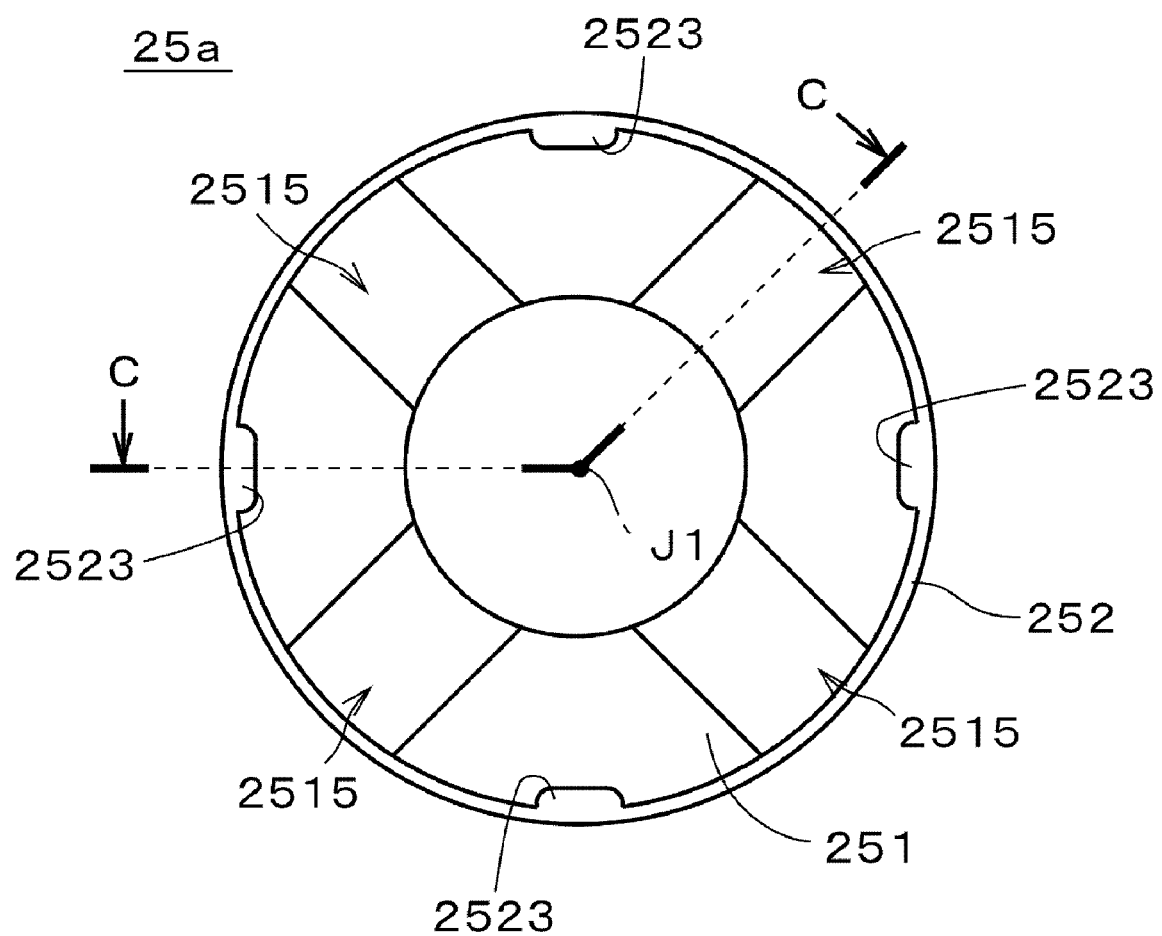
FIG. 18 is a bottom view of an upper cap according to another preferred embodiment.
Figure 19:
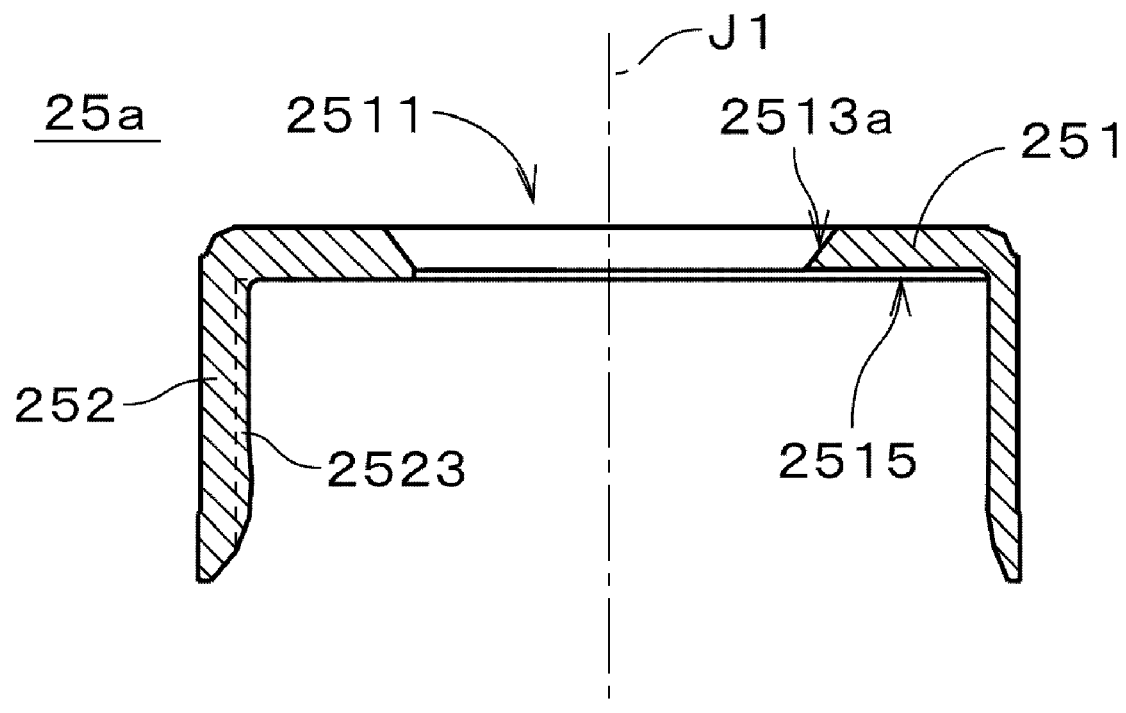
FIG. 19 is a cross-sectional view of the upper cap according to another preferred embodiment, taken along a plane including the central axis.

FIG. 18 is a bottom view of the upper cap 25a of the bearing mechanism 2a. FIG. 19 is a cross-sectional view of the upper cap 25a taken as indicated by arrows C in FIG. 18. As illustrated in FIG. 19, the upper cap 25a has, provided on an inner circumferential surface 2513a of the opening portion 2511 provided in the top portion 251, an inclined plane whose diameter gradually widens in the upward direction. As illustrated in FIG. 17, the second sloping gap in the second tapered seal portion 272, which defines the second capillary seal portion, is defined by the inclined inner circumferential surface 2513a and the outer circumferential surface of the shaft 22.

As illustrated in FIGS. 18 and 19, the upper cap 25a has provided on the lower surface of the top portion 251 thereof four wide grooves 2515 extending radially from an inner circumferential portion to an outer circumferential portion thereof. In addition, the cap 25a has, provided on the inner circumferential surface of the cylindrical portion 252 thereof, four ribs 2523, which are projections extending parallel to the central axis J1.

Note that, while the top portion 251 may have the grooves 2515 on the lower surface thereof, portions between the grooves 2515 may be interpreted as projections, and that, on the lower surface of the top portion 251, portions that are recessed relative to principal regions and extend linearly in the radial direction can be interpreted as "grooves" and portions that are raised can be interpreted as "projections".

This also applies to the inner circumferential surface of the cylindrical portion 252 of the upper cap 25a. The grooves 2515 are substantially equally spaced from one another in the circumferential direction, and each of the ribs 2523 is positioned in the middle of a pair of neighboring grooves 2515 in the circumferential direction. In other words, circumferential positions of the grooves 2515 substantially coincide with those of portions between the ribs 2523.

As illustrated in FIG. 17, when the upper cap 25a is press fit onto the sleeve 21, the channel cross-sectional area of the upper side channel 267 is enlarged easily due to the grooves 2515 opposed to the upper surface 211 of the sleeve 21.

The ribs 2523 are press fitted onto and brought into contact with the outer circumferential surface 212 of the sleeve 21, resulting in a gap between the inner circumferential surface of the upper cap 25a and the outer circumferential surface 212 of the sleeve 21, whereby the channel cross-sectional area of the outside upper channel 266 is easily enlarged.

The grooves 2515 and the ribs 2523 contribute to making the channel cross-sectional area of the second channel 26b, which includes the upper side channel 267 and the outside upper channel 266, larger than that of the first channel 26a, which includes the outside lower channel 265, and thereby making the channel resistance in the second channel 26b lower than the channel resistance in the first channel 26a. In addition, the arrangement of each of the grooves 2515 in the middle of neighboring ribs 2523 in the circumferential direction as illustrated in FIG. 18 contributes to making the flow from the outside upper channel 266 into the upper side channel 267 smoother to achieve an additional reduction in the channel resistance.

Note that the circumferential width of the portions between the grooves 2515 is preferably greater than the width of the upper surface grooves 2111 of the sleeve 21, and that the circumferential width of the ribs 2523 is preferably greater than the width of the outer circumferential surface grooves 2121 of the sleeve 21. This prevents the portions between the grooves 2515 and the ribs 2523 from falling into the upper surface grooves 2111 or the outer circumferential surface grooves 2121.

As described above, the stable circulation of the lubricating oil is achieved by reducing the channel resistance in the second channel 26b, which runs between and connects the first tapered seal portion 271, which defines the first capillary seal portion, and the second tapered seal portion 272, which defines the second capillary seal portion.

Moreover, as with the first and second tapered seal portions 271 and 272 as illustrated in FIG. 15, the slope angle of the first tapered seal portion 271 is less than the slope angle of the second tapered seal portion 272, so that the pressure applied onto the lubricating oil in the first tapered seal portion 271 is greater than the pressure applied onto the lubricating oil in the second tapered seal portion 272. That further contributes to reducing the influence of the resistance in the second channel 26b on the first liquid/gas interface 2711 in the first tapered seal portion 271.

Figure 20:
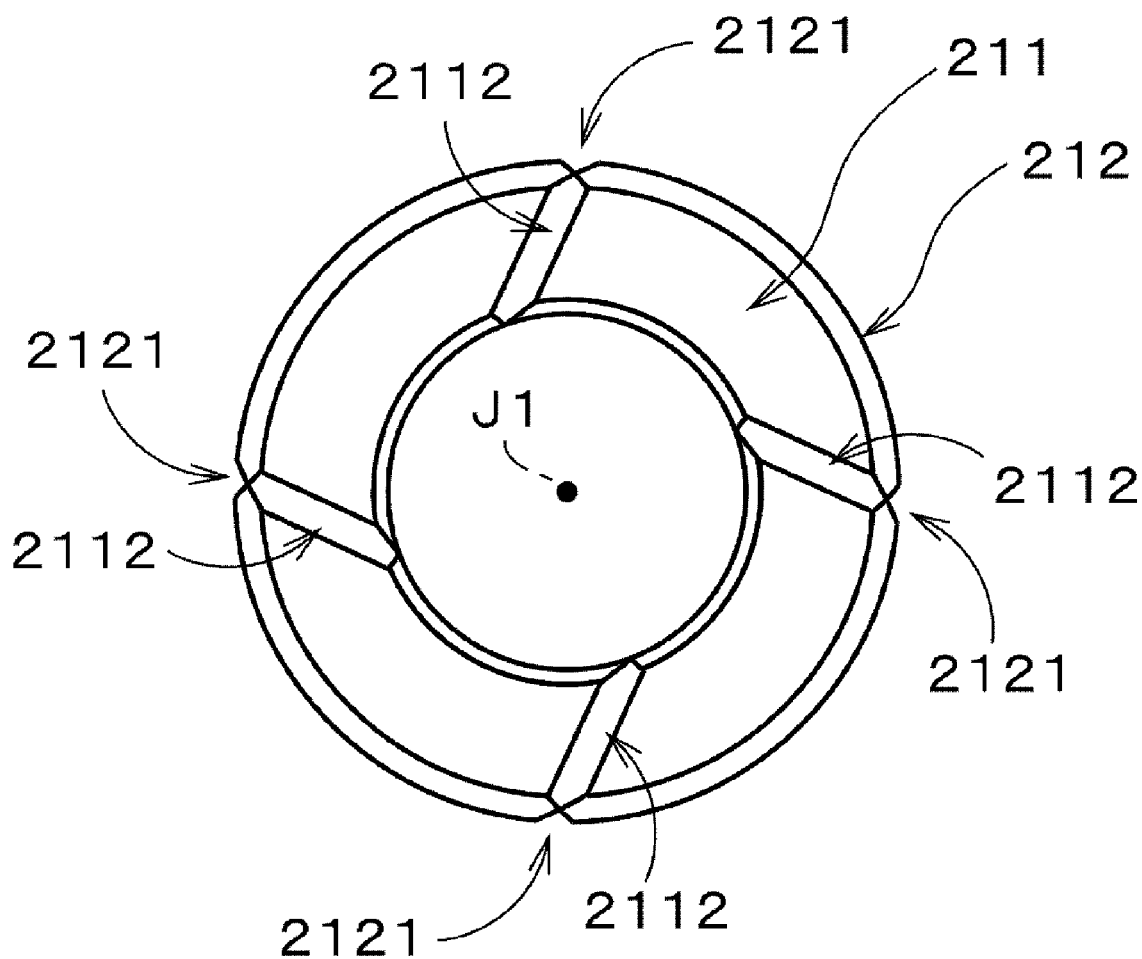
FIG. 20 is a plan view of a sleeve according to another preferred embodiment.
Figure 21:
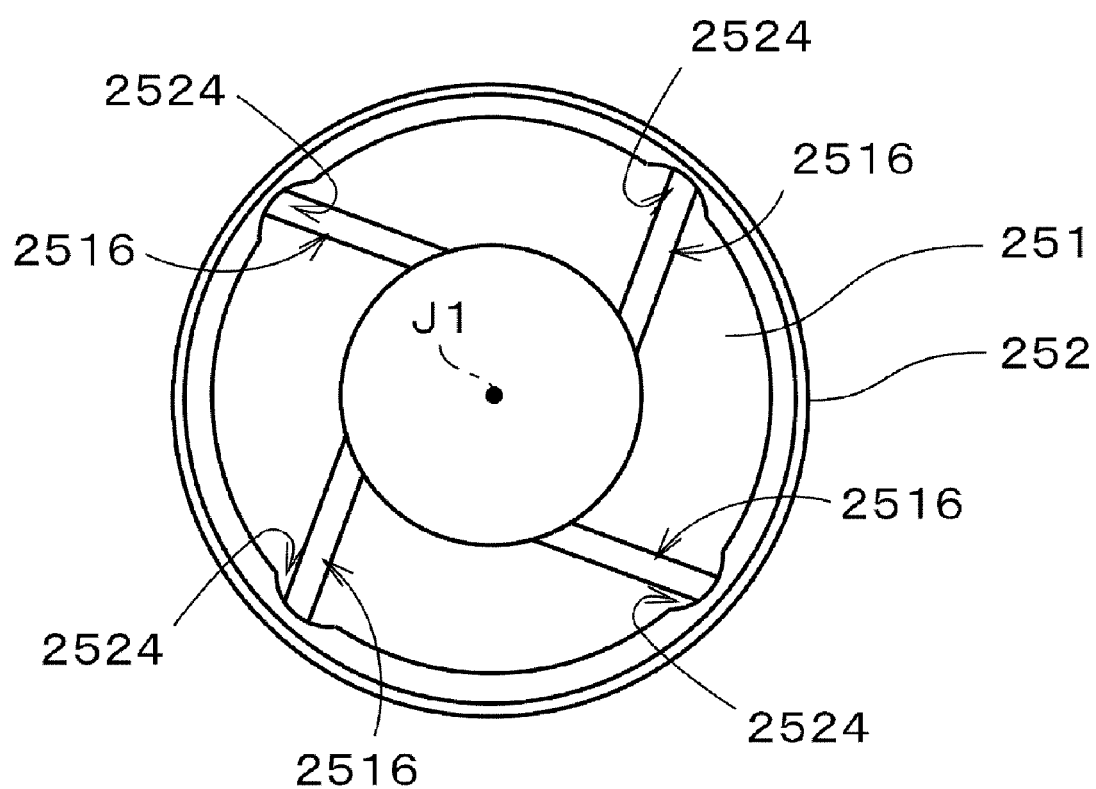
FIG. 21 is a bottom view of the upper cap according to another preferred embodiment.

FIG. 20 is a plan view of a sleeve in the bearing mechanism 2 according to another preferred embodiment. FIG. 21 is a bottom view of an upper cap in the bearing mechanism 2 according to another preferred embodiment.

A sleeve 21a as illustrated in FIG. 20 has provided on the upper surface 211 thereof upper surface grooves 2112, which extend linearly from the inner circumferential portion to the outer circumferential portion thereof in the radial direction and which are inclined with respect to the radial direction (i.e., "offset" with respect to the central axis J1). The upper surface grooves 2112 are connected to the outer circumferential surface grooves 2121 on the outer circumferential surface 212.

An upper cap 25b as illustrated in FIG. 21 has grooves 2516 provided on the lower surface of the top portion 251, the grooves 2516 extending linearly from the inner circumferential portion to the outer circumferential portion thereof in the radial direction and being inclined with respect to the radial direction. The grooves 2516 are connected to recessed portions 2524, which extend substantially parallel to the central axis J1 on the inner circumferential surface of the cylindrical portion 252.

The linear shape of the upper surface grooves 2112 and the grooves 2516 on the sleeve 21a and the upper cap 25b contributes to molding of the grooves.

As illustrated in FIG. 20, the circumferential width of portions between the upper surface grooves 2112 of the sleeve 21a (i.e., portions that are projected between neighboring grooves) gradually decreases inwardly in the radial direction, while the minimum width of these portions is greater than the circumferential width of the grooves 2516 of the upper cap 25b as illustrated in FIG. 21. This prevents a portion of the upper surface 211 of the sleeve 21a from falling into any groove 2516 of the upper cap 25b.

In addition, the circumferential width of portions between the grooves 2516 of the upper cap 25b (i.e., portions that are projected between neighboring grooves) gradually decreases inwardly in the radial direction, while the minimum width of these parts is greater than the circumferential width of the upper surface grooves 2112 of the sleeve 21a. This prevents a portion of the lower surface of the top portion 251 of the upper cap 25b from falling into any upper surface groove 2112 of the sleeve 21a.

This contributes to ensuring that an assembly composed of the sleeve 21a and the upper cap 25b will have a desired height in the direction parallel to the central axis J1, when the bearing mechanism 2 is in an assembled condition.

The upper surface grooves 2112 of the sleeve 21a and the grooves 2516 of the upper cap 25b are preferably brought into contact with the portions between the grooves 2516 of the upper cap 25b and the portions between the upper surface grooves 2112 of the sleeve 21a, respectively, resulting in easy formation of the upper side channel 267 (see FIG. 2). The sleeve 21a and the upper cap 25b are identical to the sleeve 21 and the upper cap 25, respectively, in the other preferred embodiments of the structure.

Figure 22:
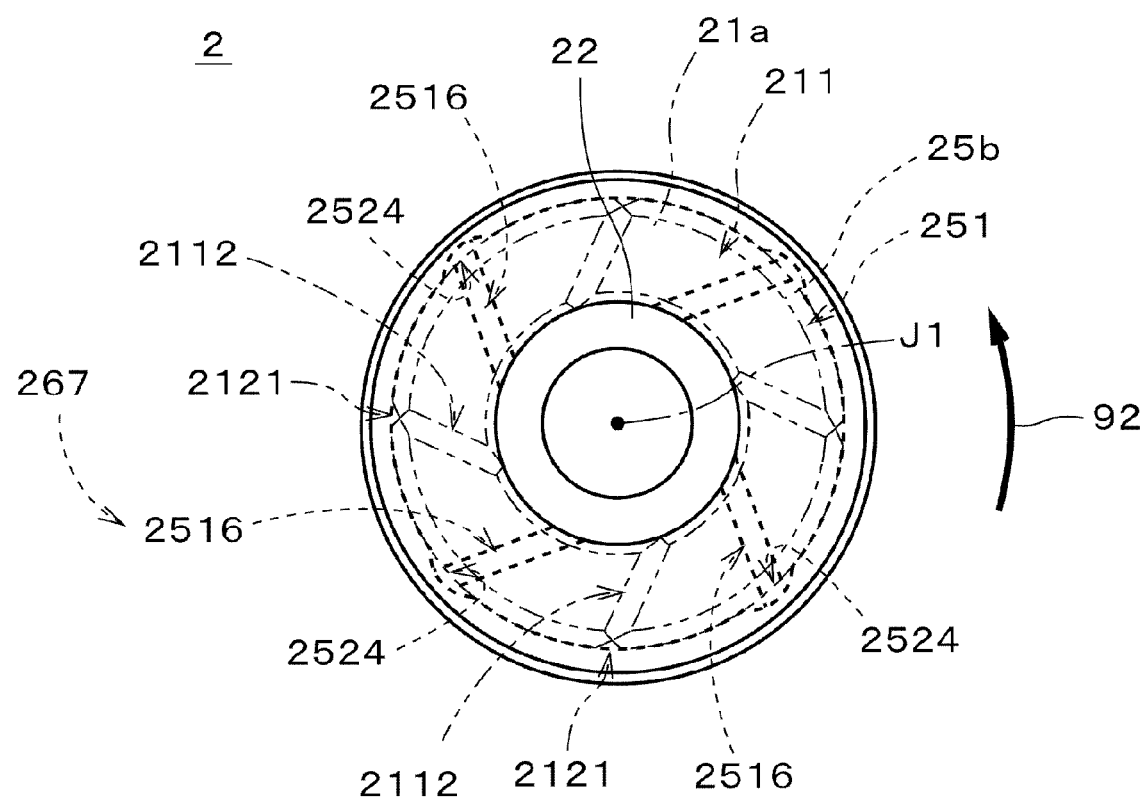
FIG. 22 is a plan view of the bearing mechanism.

FIG. 22 is a plan view of the bearing mechanism 2, illustrating the arrangement of the sleeve 21a, the upper cap 25b, and the shaft 22. Note that the illustration of the housing member 241 (see FIG. 2) is omitted.

In FIG. 22, the shape of the upper surface 211 of the sleeve 21a is indicated by thin chain double-dashed lines, while the shape of the lower surface of the top portion 251 of the upper cap 25b is indicated by thick broken lines.

Both the upper surface grooves 2112 of the sleeve 21a and the grooves 2516 of the upper cap 25b are, when viewed as extending outwardly in the radial direction, inclined in a direction opposite to the rotational direction of the shaft 22. In FIG. 22, the rotational direction of the shaft 22 is indicated by an arrow 92.

While the motor 1 is driven, the lubricating oil, flowing from the outer circumferential surface grooves 2121 of the sleeve 21a and the recessed portions 2524 of the upper cap 25b into the upper side channel 267, travels inward in the radial direction and forward in the rotational direction of the shaft 22. This allows the lubricating oil to flow into the radial gap 261 smoothly. The upper side channel 267 is composed of the upper surface grooves 2112 of the sleeve 21a and the grooves 2516 of the upper cap 25b.

This contributes in the motor 1 to reducing channel resistance against the lubricating oil at an end portion of the upper side channel 267 on the central axis J1 side, i.e., a boundary between the upper side channel 267 and the radial gap 261, and thereby smoothing the flow of the lubricating oil.

Note that the sleeve 21a and the upper cap 25b may be secured to each other in such a manner that a portion of the upper surface grooves 2112 of the sleeve 21a and a portion of the grooves 2516 of the upper cap 25b overlap with each other in the direction parallel to the central axis J1.

Also note that the relative arrangement of the upper surface grooves 2112 of the sleeve 21a and the grooves 2516 of the upper cap 25b may be provided in any desirable manner. Also note that the upper surface grooves 2112 of the sleeve 21a and the grooves 2516 of the upper cap 25b may be inclined in mutually different directions.

Figure 23:
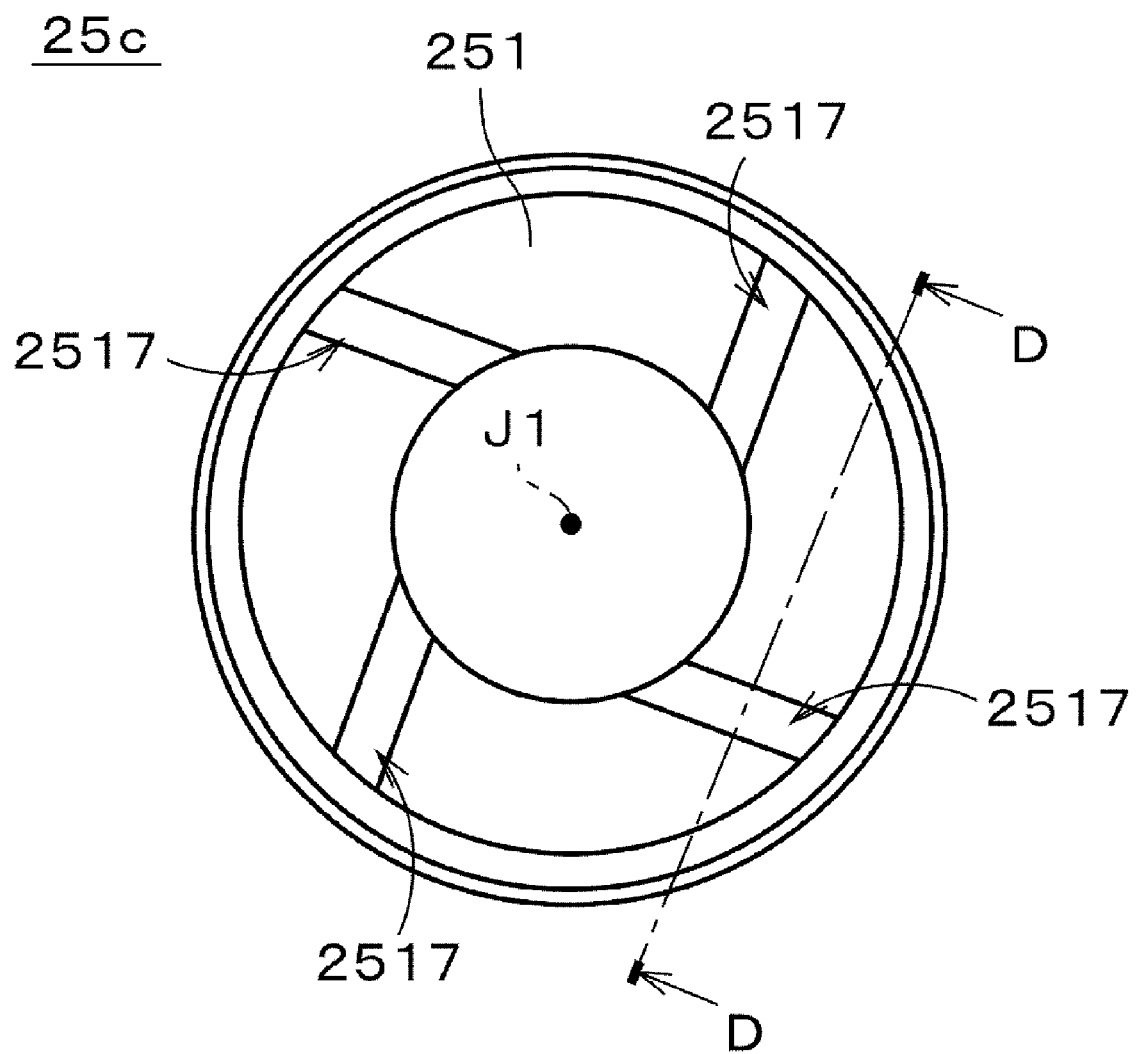
FIG. 23 is a bottom view of an upper cap according to another preferred embodiment.
Figure 24:
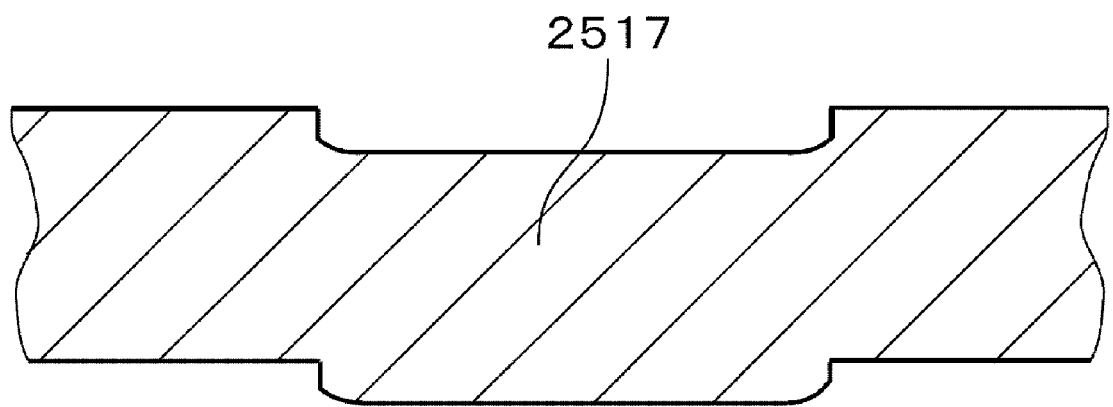
FIG. 24 is a partial cross-sectional view of the upper cap.

FIG. 23 is a bottom view of an upper cap of the bearing mechanism 2 according to yet another preferred embodiment. FIG. 24 is a diagram of a partial section of an upper cap 25c as illustrated in FIG. 23 taken as indicated by arrows D.

In place of the grooves 2516 provided on the top portion 251 of the upper cap 25b as illustrated in FIG. 21, the upper cap 25c has four linear rib-shaped projections 2517 arranged in the circumferential direction. The projections 2517 are, when viewed as extending outwardly in the radial direction, inclined in a direction opposite to the rotational direction of the shaft 22 (see reference numeral 92 in FIG. 22, which is a plan view).

The circumferential width of the projections 2517 is preferably greater than the circumferential width of the upper surface grooves 2112 of the sleeve 21a. This contributes to preventing the projections 2517 from falling into the upper surface grooves 2112 of the sleeve 21a when the upper cap 25c is fitted onto the sleeve 21a.

This achieves easy formation of the upper side channel 267 (see FIG. 2) between the lower surface of the top portion 251 of the upper cap 25c and the upper surface 211 of the sleeve 21a.

While the motor 1 is driven, the lubricating oil, flowing into the upper side channel 267, travels inward in the radial direction along directions in which the projections 2517 of the upper cap 25c extend and forward in the rotational direction of the shaft 22. This contributes to reducing the channel resistance at the end portion of the upper side channel 267 on the central axis J1 side, or smoothing the flow of the lubricating oil.

Figure 25:
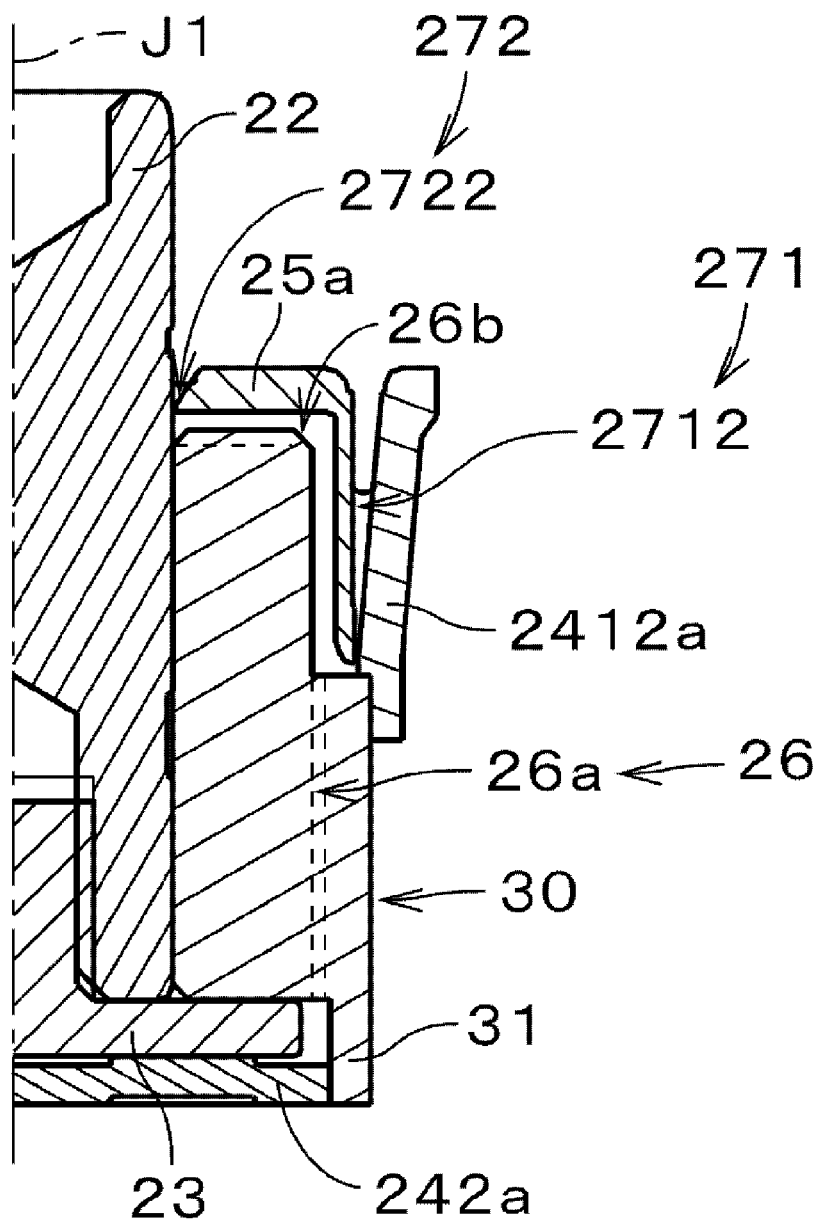
FIG. 25 is a cross-sectional view of a bearing mechanism according to yet another preferred embodiment, taken along a plane including a central axis.

FIG. 25 is a cross-sectional view of a bearing mechanism for use in the motor 1 according to yet another preferred embodiment, taken along a plane including the central axis. A bearing mechanism 2b as illustrated in FIG. 25 includes a substantially cylindrical sleeve 30, an annular inclined portion 2412a, and a disk-shaped lower cap 242a. The bearing mechanism 2b preferably further includes the shaft 22, the thrust plate 23, and the upper cap 25a as used in the bearing mechanism 2a as illustrated in FIG. 17.

The sleeve 30 has a relatively small outer diameter on an upper portion thereof, and has provided at an outer circumference on a lower surface thereof an annular raised portion 31 protruding downward. The shaft 22, with the thrust plate 23 fitted on the lower end portion thereof, is inserted into the sleeve 30 from below, so that the thrust plate 23 is arranged inward of the annular raised portion 31.

The lower cap 242a is secured to an inner circumferential surface of the annular raised portion 31, so that a lower surface of the thrust plate 23 is covered. The upper cap 25a is preferably press fitted, for example, onto a top of the sleeve 30, while the annular inclined portion 2412a, whose diameter increases gradually in the upward direction, is secured to a shoulder portion at an outer circumferential surface of the sleeve 30. This results in formation of the first sloping gap 2712 in the first tapered seal portion 271 as illustrated in FIG. 17 at an outer circumference of the sleeve 30, and formation of the second sloping gap 2722 in the second tapered seal portion 272 around a circumference of the shaft 22.

Inside the sleeve 30 is provided a communicating channel extending from a lower surface of the sleeve toward the shoulder portion substantially in parallel with the central axis J1. This allows the lubricating oil to flow from the thrust gap, which is defined between the lower surface of the sleeve 30 and the upper surface of the thrust plate 23, to the lower portion of the first tapered seal portion 271. In other words, the first channel 26a is arranged inside the sleeve 30 to connect the thrust gap with the first tapered seal portion 271.

The second channel 26b, which connects the first tapered seal portion 271 with the second tapered seal portion 272, is formed in a similar manner to that in which the outside upper channel 266 and the upper side channel 267 are defined in the bearing mechanism 2a as illustrated in FIG. 17. As in the bearing mechanism 2a, the channel cross-sectional area of the second channel 26b is larger than the channel cross-sectional area of the first channel 26a, and the channel resistance in the second channel 26b is lower than the channel resistance in the first channel 26a.

This contributes to the stable retention of the lubricating oil in the first tapered seal portion 271 and the second tapered seal portion 272. The slope angle of the second sloping gap 2722 is greater than the slope angle of the first sloping gap 2712 (which is also true with FIGS. 26 to 28).

Figure 26:
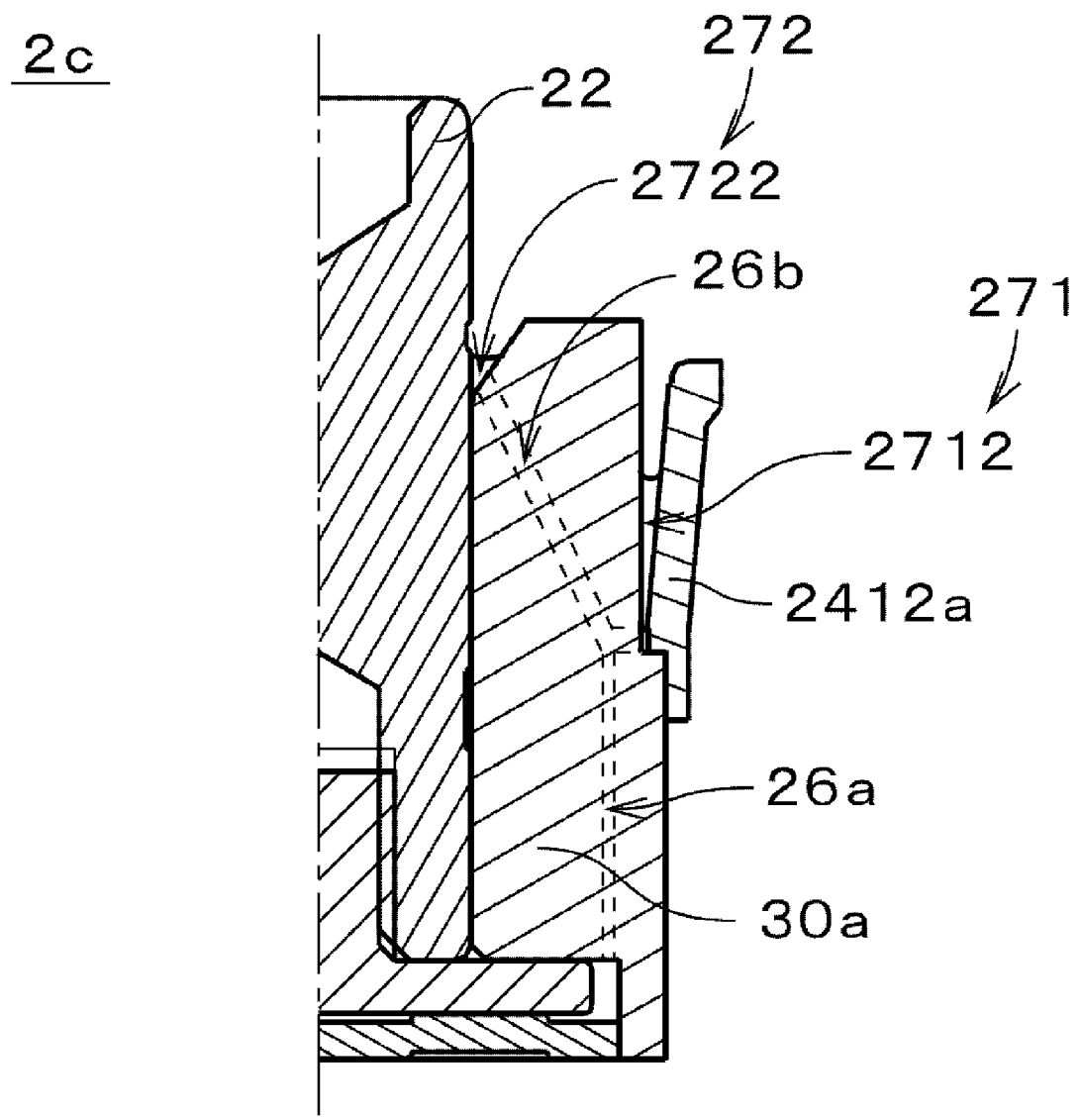
FIG. 26 is a cross-sectional view of a bearing mechanism according to yet another preferred embodiment, taken along a plane including a central axis.

FIG. 26 is a cross-sectional view of a bearing mechanism for use in the motor 1 according to yet another preferred embodiment, taken along a plane including the central axis. A bearing mechanism 2c as illustrated in FIG. 26 is different from the bearing mechanism 2b as illustrated in FIG. 25 in that the upper cap 25a is absent and in the structures of the first and second tapered seal portions 271 and 272. The bearing mechanism 2c is identical to the bearing mechanism 2b in the other preferred embodiments of the structure except that the second channel 26b is defined by a communicating channel provided inside the sleeve.

A sleeve 30a of the bearing mechanism 2c is substantially cylindrical, and has the annular inclined portion 2412a as used in the bearing mechanism 2b of FIG. 25 attached to a shoulder portion on an outer circumferential surface of the sleeve 30a. The annular inclined portion 2412a is radially opposed to the outer circumferential surface of the sleeve 30a.

In addition, the sleeve 30a has, an inclined plane whose diameter gradually increases in the upward direction provided at a top portion of an inner circumferential surface thereof. This results in the first sloping gap 2712 of the first tapered seal portion 271 being defined at an outer circumference of the sleeve 30a, and the second sloping gap 2722 of the second tapered seal portion 272 being defined around the circumference of the shaft 22.

The sleeve 30a has the first channel 26a and the second channel 2b inside it. As in the sleeve 30 as illustrated in FIG. 25, the first channel 26a connects the thrust gap on the lower surface thereof with the first tapered seal portion 271. The second channel 26b connects a location close to a lower end portion of the first tapered seal portion 271 with the second tapered seal portion 272. The channel cross-sectional area of the second channel 26b is larger than the channel cross-sectional area of the first channel 26a, and the channel resistance in the second channel 26b is lower than the channel resistance in the first channel 26a. This contributes to the stable retention of the lubricating oil in the first tapered seal portion 271 and the second tapered seal portion 272.

Figure 27:
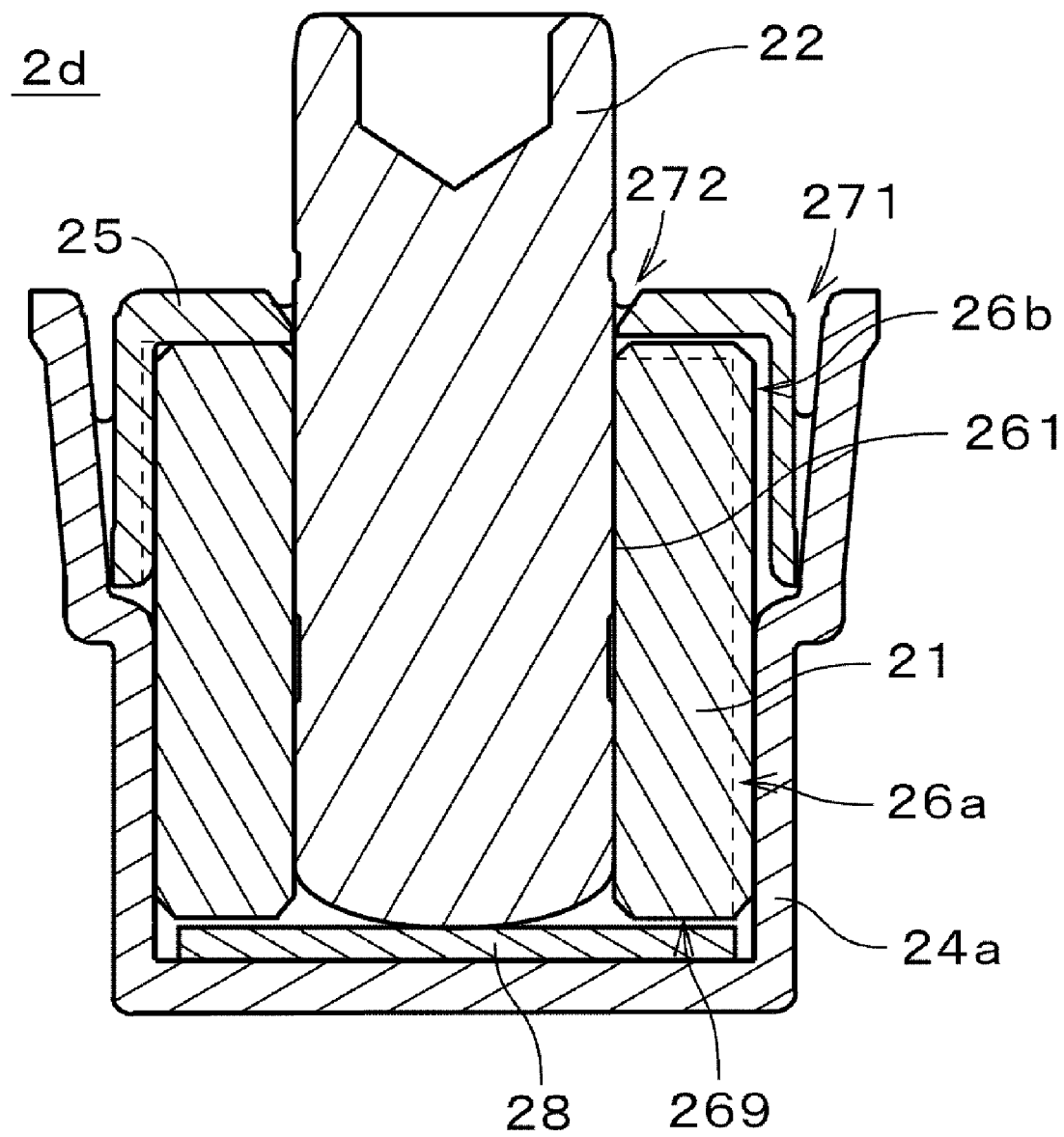
FIG. 27 is a cross-sectional view of a bearing mechanism according to yet another preferred embodiment, taken along a plane including a central axis.

FIG. 27 is a cross-sectional view of a bearing mechanism for use in the motor 1 according to yet another preferred embodiment, taken along a plane including the central axis.

A bearing mechanism 2d as illustrated in FIG. 27 is different from the bearing mechanism 2a as illustrated in FIG. 17 in that the thrust plate is absent and that the lower end of the shaft 22 is in contact with a plate 28, which is attached to an inner bottom surface of a sleeve housing 24a. The bearing mechanism 2d is identical to the bearing mechanism 2a of FIG. 17 in the other preferred embodiments of the structure except that the sleeve housing 24a is arranged as a single member defined by the housing member 241 and the lower cap 242 as illustrated in FIG. 2.

The lower end portion of the shaft 22 is preferably spherical, and the lower end portion of the shaft is in contact with an upper surface of the plate 28, which is preferably made of a wear-resistant material. The lower end portion of the shaft and the plate 28 combine to define a pivot bearing arranged to support the shaft 22 in the axial direction. Note that the sleeve 21 does not have a dynamic pressure groove on the lower surface thereof.

The first channel 26a is defined by a gap 269 and the outside lower channel defined by the outer circumferential surface grooves of the sleeve 21. The first channel 26a connects the radial gap 261 with the first tapered seal portion 271. The lubricating oil flows from a bottom portion of the radial gap to the outer circumferential surface of the sleeve 21 by way of the gap 269 between the lower surface of the sleeve 21 and the upper surface of the plate 28.

As in the bearing mechanism 2a of FIG. 17, the second channel 26b, which connects the first tapered seal portion 271 with the second tapered seal portion 272, is defined between the upper cap 25 and the sleeve 21.

In addition, the channel cross-sectional area of the second channel 26b is larger than the channel cross-sectional area of the first channel 26a, and the channel resistance in the second channel 26b is lower than the channel resistance in the first channel 26a. This contributes to the stable retention of the lubricating oil in the first tapered seal portion 271 and the second tapered seal portion 272.

Figure 28:
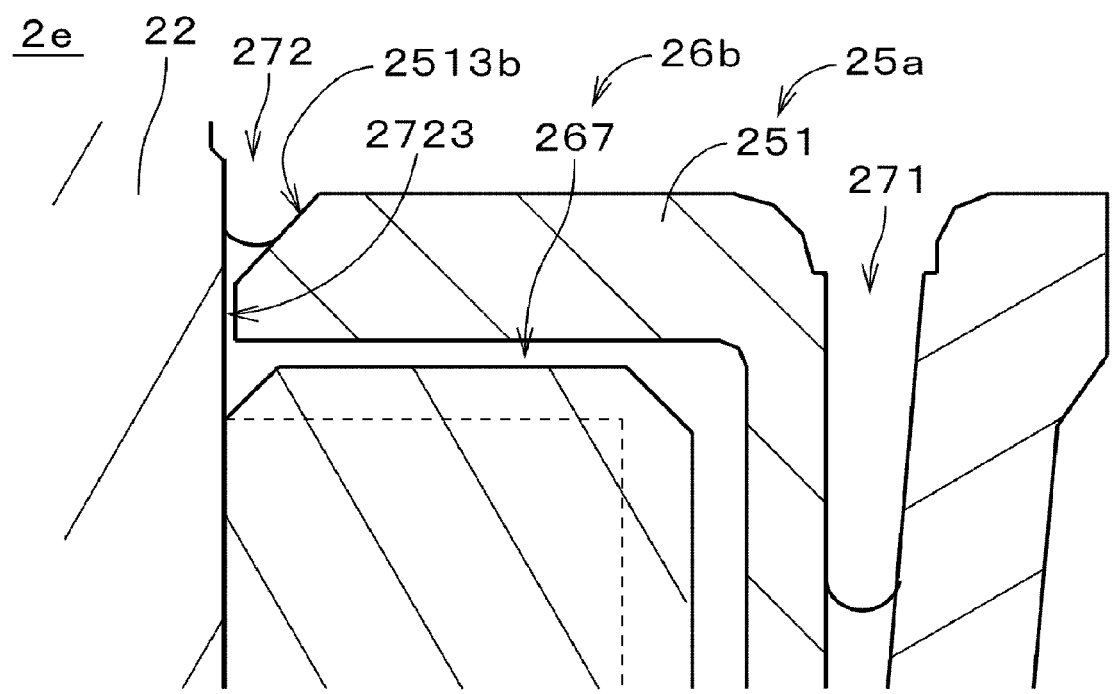
FIG. 28 is an enlarged view of an upper portion of a bearing mechanism according to yet another preferred embodiment.

FIG. 28 is an enlarged view of an upper portion of a bearing mechanism for use in the motor 1 according to yet another preferred embodiment. A bearing mechanism 2e as illustrated in FIG. 28 is different from the bearing mechanism 2a as illustrated in FIG. 17 in the shape of the inner circumferential surface of the top portion 251 of the upper cap 25a, and identical to the bearing mechanism 2a as illustrated in FIG. 17 in the other preferred embodiments of the structure.

An inner circumferential surface 2513b of the upper cap 25a of the bearing mechanism 2e has a substantially cylindrical lower portion, and has an inclined upper portion whose inside diameter gradually increases in the upward direction. This results in formation of an annular gap 2723 between the cylindrical lower portion of the inner circumferential surface 2513b and the outer circumferential surface of the shaft 22. The gap 2723 connects the end portion of the upper side channel 267 on the shaft 22 side with a bottom portion of the second tapered seal portion 272.

As described above, in the bearing mechanism 2e, the second channel 26b connects the first tapered seal portion 271 with the second tapered seal portion 272 via the gap 2723. In addition, the an arrangement of the gap 2723, which is narrow and cylindrical, at the bottom portion of the second tapered seal portion 272 contributes to increasing resistance against upward flow of the lubricating oil to prevent a rise of the liquid/gas interface and resultant leakage of the lubricating oil.

Figure 29:
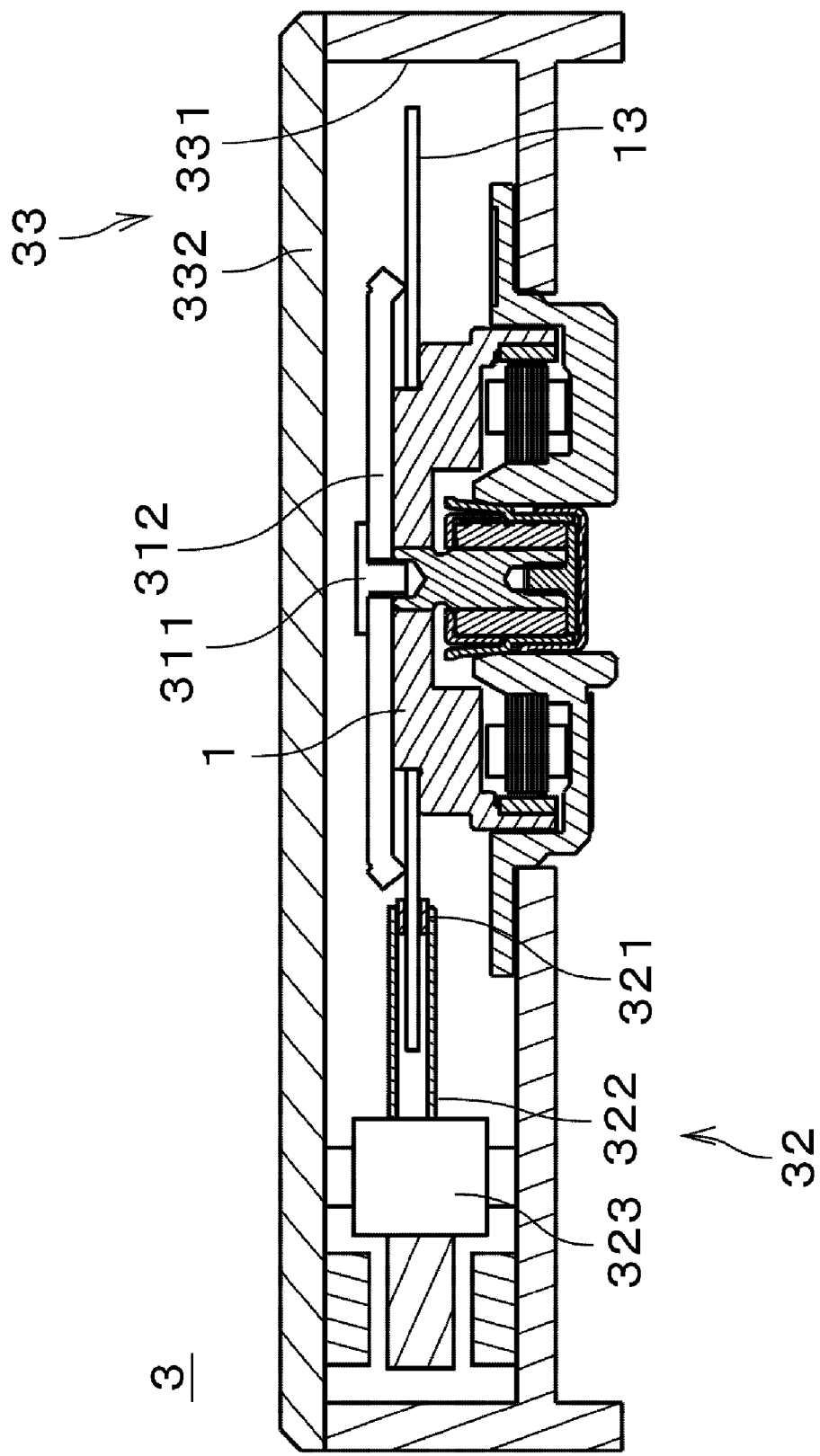
FIG. 29 is a diagram illustrating a recording disk drive apparatus.

FIG. 29 is a cross-sectional view of a recording disk drive apparatus 3 in which the motor 1 is installed. The recording disk drive apparatus 3 is a so-called hard disk drive. In the recording disk drive apparatus 3, a screw 311 and a damper 312 are preferably used to have the recording disk 13, which is disk-shaped and on which information is recorded, fixed onto the motor 1. An access portion 32 is used to write and read the information to or from the recording disk 13. A case housing 33 is contained in the recording disk 13, the motor 1, and the access portion 32.

The case housing 33 includes a first case housing member 331, which is substantially cup-shaped, and a second case housing member 332, which is substantially flat. The first case housing member 331 has an opening on an upper side thereof, while the motor 1 and the access portion 32 are attached to an inside bottom surface thereof. The second case housing member 332 covers the opening of the first case housing member 331.

In the recording disk drive apparatus 3, the second case housing member 332 is joined to the first case housing member 331 to define the case housing 33, so that the housing has a clean inside space where dust is substantially absent.

The access portion 32 preferably includes a magnetic head 321, an arm 322 arranged to support the head 321, and a head actuator mechanism 323. The magnetic head 321 is placed close to the recording disk 13 to read and write the information therefrom or thereto. The head actuator mechanism 323 moves the arm 322 to move the head 321 relative to the recording disk 13 and the motor 1.

According to the above-described structure, the head 321, placed close to the recording disk 13 being rotated by the motor 1, writes or reads the information to or from a desired location on the recording disk 13.

While several preferred embodiments of the present invention have been described above, it will be understood that the present invention is not limited to the above-described preferred embodiments, and that various modifications are possible.

The first tapered seal portion 271 as illustrated in FIG. 15 does not necessarily need to open upwardly, but may instead open downwardly, for example. The slope angles θ1 and θ2 may not necessarily be about 5 degrees and about 34 degrees, respectively, but may be other angles so long as θ1<θ2.

In the radial gap 261 as illustrated in FIG. 2, in place of the radial dynamic pressure grooves 221 provided on the shaft 22 (see FIG. 6), radial dynamic pressure grooves may be provided on the inner circumferential surface of the sleeve 21. Also, in the first thrust gap 262, in place of the thrust dynamic pressure grooves 2131 on the lower surface 213 of the sleeve 21, thrust dynamic pressure grooves may be defined on the upper surface of the thrust plate 23. Also, in the second thrust gap 263, in place of the thrust dynamic pressure grooves 2311 on the lower surface of the thrust plate 23, thrust dynamic pressure grooves may be defined on a bottom surface of the sleeve housing 24.

In FIGS. 9 to 11, the lower cap 242 is a separate member in the sleeve housing 24. Note, however, that this is not essential to the present invention, and that the sleeve housing 24 may be replaced by a sleeve housing provided as a single member that substantially assumes the shape of a cylinder with a bottom.

Moreover, as long as the upper surface 211 and an upper portion of the outer circumferential surface 212 of the sleeve 21 are covered by the upper cap, and the lower surface 213 and at least a lower portion of the outer circumferential surface 212 of the sleeve 21 are covered by the sleeve housing, the upper cap and the sleeve housing may have various other forms.

The number of raised portions 2512 of the top portion 251 of the upper cap 25 and that of recessed portions 2521 of the cylindrical portion 252 may not necessarily be four as illustrated in FIG. 12, but may be any number greater than one.

Also, the number of grooves 2515 and ribs 2523 of the upper cap 25a as illustrated in FIGS. 18 and 19 need not necessarily be four, but may be any desirable number as long as the number of grooves 2515 is greater than one and the number of ribs 2523 is greater than two.

Also, the number of grooves 2516 and projections 2517 as illustrated in FIGS. 21 and 23 may be any desirable number greater than one. Moreover, the number of upper surface grooves of the sleeve is not limited to the number in the above-described preferred embodiments but may be any number greater than one.

In the bearing mechanism 2e as illustrated in FIG. 28, the inner circumferential surface of the top portion 251 of the upper cap 25a may be substantially cylindrical from top to bottom. In this case, the shaft 22 has a minute concentric cylindrical gap along an outer circumference thereof, and a capillary seal portion is defined by retaining the lubricating oil in this gap using capillary action. The second channel 26b connects the first tapered seal portion 271 (i.e., the first capillary seal portion) with the capillary seal portion (i.e., the second capillary seal portion). Note that a gap width of the capillary seal portion is preferably smaller than a minimum gap width of a first tapered gap of the first tapered seal portion 271.

Figure 30:
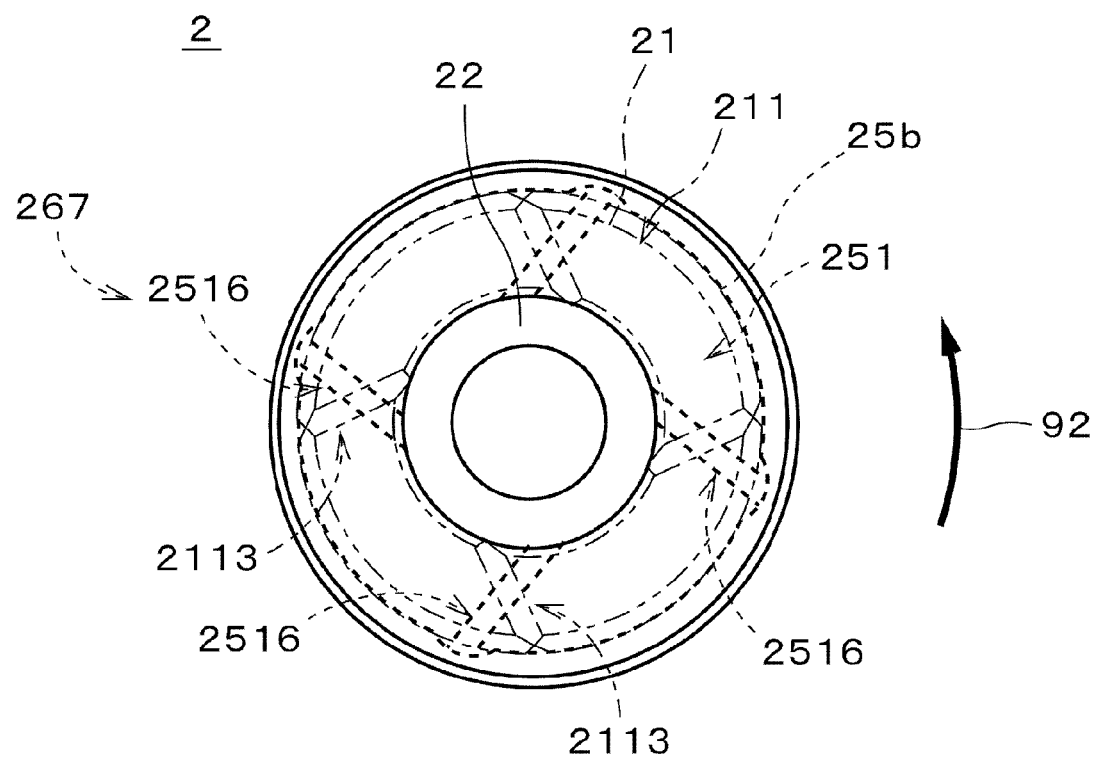
FIG. 30 is a plan view of a bearing mechanism according to yet another preferred embodiment.

FIG. 30 is a diagram illustrating an exemplary variation of the bearing mechanism 2 as illustrated in FIG. 22, where the grooves 2516 on the top portion 251 of the upper cap 25b are, when viewed as extending outwardly in the radial direction, inclined in the direction opposite to the rotational direction of the shaft 22. On the upper surface 211 of the sleeve 21 are formed upper surface grooves 2113, which are inclined in the rotational direction of the shaft 22 when viewed as extending outwardly in the radial direction.

In this case also, the lubricating oil in the upper side channel 267 travels inward in the radial direction along the grooves 2516 of the upper cap 25b and forward in the rotational direction of the shaft 22. This allows the lubricating oil to flow into the radial gap 261 smoothly, reducing the channel resistance, and contributes to smoothing the flow. Also, in place of the upper surface grooves 2113, the upper surface grooves 2111, which extend in the radial direction as illustrated in FIG. 3, may be formed on the sleeve 21.

Similarly, in the case where, as illustrated in FIG. 20, the upper surface grooves 2112, which are, when viewed as extending outwardly in the radial direction, inclined in the direction opposite to the rotational direction of the shaft 22, are formed on the upper surface 211 of the sleeve 21a, grooves or projections that are, when viewed as extending outwardly in the radial direction, inclined in the rotational direction of the shaft 22, or which extend in the radial direction may be formed on the lower surface of the top portion of the upper cap.

Figure 31:
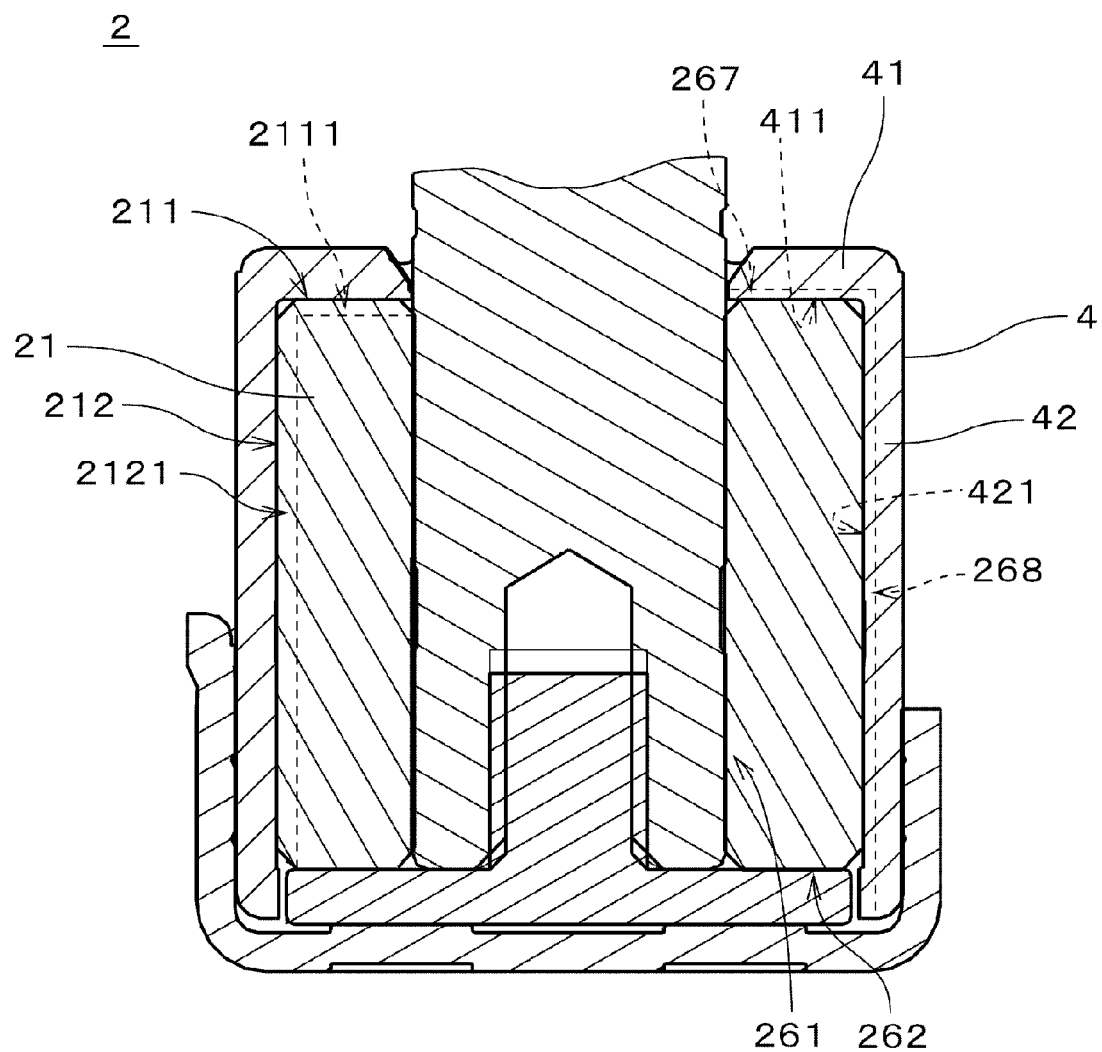
FIG. 31 is a vertical section of a bearing mechanism according to yet another preferred embodiment.

The arrangement of the upper surface grooves on the sleeve and the arrangement of the grooves or projections on the lower surface of the top portion of the upper cap are applicable to various bearing mechanisms. For example, they are applicable to a bearing mechanism 2 as illustrated in FIG. 31 having an annular member 4 which is substantially cylindrical and covers the upper surface 211 and the entire outer circumferential surface 212 of the sleeve 21. The annular member 4 corresponds to a single member that combines the upper cap 25 and the housing member 241 as illustrated in FIG. 2. The first tapered seal portion 271 as illustrated in FIG. 2 is not provided when the annular member 4 is used. The bearing mechanism 2 is identical to the bearing mechanism as illustrated in FIG. 2 in the other preferred embodiments of the structure.

The annular member 4 preferably has a top portion 41, which is flat and annular and has provided on a lower surface thereof a plurality of top portion grooves 411 (which are indicated by broken lines) extending from an inner circumference to an outer circumference thereof; and a side portion 42, which is provided with side portion grooves 421 (which are indicated by broken lines) connected to the top portion grooves 411. The upper side channel 267 is defined by the top portion grooves 411 and the upper surface grooves 2111 of the sleeve 21, whereas an outside channel 268 is defined by the side portion grooves 421 and the outer circumferential surface grooves 2121 of the sleeve 21.

The upper side channel 267 and the outside channel 268 are connected to the radial gap 261 and the first thrust gap 262, respectively, to secure the circulation path for the lubricating oil that circulates along the circumference of the sleeve 21.

While the motor 1 as illustrated in FIG. 1 is an outer rotor-type motor, it will be understood that this is not essential to the present invention, and that an inner rotor-type motor may be used in other preferred embodiments of the present invention. The motor 1 may be used in applications other than a recording disk drive apparatus. In other preferred embodiments of the present invention, other recording disk drive apparatuses than the recording disk drive apparatus 3 as used in the above-described preferred embodiments may be used, as long as they are configured to perform one or both of reading and writing of the information from or to the recording disk 13.

Also, in the outside lower channel 265, in place of the outer circumferential surface grooves 2121 of the sleeve 21, grooves that extend in the axial direction may be provided on an inner circumferential surface of the housing member 241. Also, while the outer circumferential surface grooves are provided on the outer circumferential surface of the sleeve, the grooves that extend in the axial direction may additionally be provided on the inner circumferential surface of the housing to define the outside lower channel.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A fluid dynamic bearing for a motor, the fluid dynamic bearing comprising:
    a substantially cylindrical sleeve centered about a central axis, the central axis extending in an upward/downward direction;
    a shaft inserted in the sleeve to be opposed to an inner circumferential surface of the sleeve with a radial gap therebetween;
    an upper cap including an opening arranged to have the shaft inserted therein, a top portion having a substantially annular shape and arranged to cover an upper surface of the sleeve, and a cylindrical portion extending downward from an outer circumferential portion of the top portion to cover an outer circumferential surface of the sleeve;
    a first capillary seal portion arranged radially outward of the radial gap to define a gap extending in an axial direction of the radial gap;
    a second capillary seal portion arranged above the radial gap to define a gap extending in the axial direction to the radial gap and the first capillary seal portion;
    lubricating oil disposed in the radial gap, the first capillary seal portion, and the second capillary seal portion;
    a first channel filled with the lubricating oil and arranged to connect a bottom portion of the radial gap with the first capillary seal portion, the first channel having a channel cross-sectional area including a first gap extending radially outward from the sleeve; and
    a second channel filled with the lubricating oil and arranged to connect the first capillary seal portion with the second capillary seal portion, the second channel having a channel cross-sectional area including a second gap extending radially between the sleeve and the cylindrical portion of the upper cap, a radial dimension of the second gap is larger than a radial dimension of the first gap.

2. The fluid dynamic bearing according to claim 1, wherein
    the gap of the first capillary seal portion is arranged to gradually expand upwardly; and
    the first capillary seal portion includes a first liquid/gas interface of the lubricating oil therein.

3. The fluid dynamic bearing according to claim 2, wherein
    the gap of the second capillary seal portion is arranged to gradually expand upwardly; and
    the second capillary seal portion includes a second liquid/gas interface of the lubricating oil therein.

4. The fluid dynamic bearing according to claim 3, wherein a slope angle of the gap of the second capillary seal portion is greater than a slope angle of the gap of the first capillary seal portion.

5. The fluid dynamic bearing according to claim 1, wherein
    the gap of the second capillary seal portion is arranged to gradually expand upwardly; and
    the second capillary seal portion includes a liquid/gas interface of the lubricating oil therein.

6. The fluid dynamic bearing according to claim 1, wherein
    the second capillary seal portion is arranged between the shaft and the upper cap.

7. The fluid dynamic bearing according to claim 6, wherein the top portion of the upper cap includes either a plurality of projections or a plurality of grooves provided on a lower surface thereof;
if the plurality of projections are provided, the plurality of projections being in contact with the upper surface of the sleeve and arranged in a circumferential direction so as to be centered about the central axis; and
if the plurality of grooves are provided, the plurality of grooves being opposed to the upper surface of the sleeve and extending from an inner circumferential portion to an outer circumferential portion of a lower surface of the top portion of the upper cap.

8. The fluid dynamic bearing according to claim 7, wherein
the sleeve includes a plurality of upper surface grooves extending from an inner circumferential portion to an outer circumferential portion of the upper surface of the sleeve provided on the upper surface thereof; and
a circumferential width of the plurality of projections or a portion between the plurality of grooves of the upper cap is greater than a circumferential width of the plurality of upper surface grooves of the sleeve.

9. The fluid dynamic bearing according to claim 6, wherein
the cylindrical portion includes either a plurality of projections or a plurality of grooves provided on an inner circumferential surface thereof;
if the plurality of projections are provided, the plurality of projections being in contact with the outer circumferential surface of the sleeve; and
if the plurality of grooves are provided, the plurality of grooves being opposed to the outer circumferential surface of the sleeve and extending in the axial direction.

10. The fluid dynamic bearing according to claim 9, wherein
the sleeve includes a plurality of outer circumferential surface grooves extending in the axial direction provided on the outer circumferential surface thereof; and
a circumferential width of the plurality of projections or a portion between the plurality of grooves on the inner circumferential surface of the cylindrical portion is greater than a width of the plurality of outer circumferential surface grooves of the sleeve.

11. The fluid dynamic bearing according to claim 6, wherein
the cylindrical portion includes either a plurality of projections or a plurality of grooves provided on an inner circumferential surface thereof;
if the plurality of projections are provided, the plurality of projections being in contact with the outer circumferential surface of the sleeve;
if the plurality of grooves are provided, the plurality of grooves being opposed to the outer circumferential surface of the sleeve and extending in the axial direction; and
a circumferential position of a portion between the plurality of projections or circumferential positions of the plurality of grooves on the lower surface of the top portion of the upper cap substantially coincide with a position of a portion between the plurality of projections or positions of the plurality of grooves on the inner circumferential surface of the cylindrical portion.

12. The fluid dynamic bearing according to claim 6, further comprising:
a sleeve housing arranged radially outward of the sleeve and arranged to cover at least a lower portion of the outer circumferential surface of the sleeve; wherein
the first capillary seal portion is arranged between an outer circumferential surface of the cylindrical portion and an inner circumferential surface of the sleeve housing, the inner circumferential surface of the sleeve housing being radially opposed to the outer circumferential surface of the cylindrical portion.

13. The fluid dynamic bearing according to claim 12, wherein an outer diameter of a bottom portion of the cylindrical portion positioned at a lower end portion of the first capillary seal portion is greater than an outer diameter of the other portions of the outer circumferential surface of the cylindrical portion.

14. The fluid dynamic bearing according to claim 1, further comprising:
a thrust plate arranged at a lower end portion of the shaft and extending radially outward from an outer circumferential surface of the shaft to be axially opposed to a lower surface of the sleeve; wherein
in a first thrust gap between an upper surface of the thrust plate and the lower surface of the sleeve, a first thrust dynamic pressure bearing portion arranged to generate fluid dynamic pressure in the lubricating oil retained in the first thrust gap is defined during rotation; and
the first thrust gap is connected to the radial gap and the first channel.

15. The fluid dynamic bearing according to claim 14, further comprising:
a sleeve housing arranged radially outward of the sleeve and arranged to cover at least a lower portion of an outer circumferential surface of the sleeve; wherein
in the first channel, the first thrust gap and the first capillary seal portion are connected with each other via a gap between the outer circumferential surface of the sleeve and an inner circumferential surface of the sleeve housing.

16. The fluid dynamic bearing according to claim 1, wherein
in the radial gap, a radial dynamic pressure bearing portion arranged to generate fluid dynamic pressure in the lubricating oil retained in the radial gap is produced by a radial dynamic pressure groove during rotation; and
the radial dynamic pressure bearing portion causes the lubricating oil retained in the radial gap to flow downward out of the radial gap.

17. A motor comprising:
the fluid dynamic bearing of claim 1;
a rotor unit including a rotor magnet; and
a stator unit including an armature opposed to the rotor magnet.

18. A recording disk drive apparatus for use with a recording disk, the recording disk drive apparatus comprising:
the motor of claim 17;
an access portion arranged to read or write information from or to the recording disk; and
a housing arranged to retain the motor and the access portion.

19. A fluid dynamic bearing for use in a motor, the fluid dynamic bearing comprising:
a substantially cylindrical sleeve centered about a central axis, the central axis extending in an upward/downward direction;
a shaft inserted in the sleeve to be opposed to an inner circumferential surface of the sleeve with a radial gap therebetween;
an upper cap including an opening arranged to have the shaft inserted therein, a top portion having a substantially annular shape and arranged to cover an upper surface of the sleeve, and a cylindrical portion extending downward from an outer circumferential portion of the top portion to cover an outer circumferential surface of the sleeve;

a first capillary seal portion arranged radially outward of the radial gap to define a gap extending in an axial direction of the radial gap;

a second capillary seal portion arranged above the radial gap to define a gap extending in the axial direction to the radial gap and the first capillary seal portion;

lubricating oil disposed in the radial gap, the first capillary seal portion, and the second capillary seal portion;

a first channel filled with the lubricating oil and arranged to connect a bottom portion of the radial gap with the first capillary seal portion, the first channel having a channel cross-sectional area including a first gap extending radially outward from the sleeve; and a second channel filled with the lubricating oil and arranged to connect the first capillary seal portion with the second capillary seal portion, the second channel having a channel cross-sectional area including a second gap extending radially between the sleeve and the cylindrical portion of the upper cap, a radial dimension of the second gap is larger than a radial dimension of the first gap such that a channel resistance of the second channel is lower than a channel resistance of the first channel.

20. A fluid dynamic bearing for use in a motor, the fluid dynamic bearing comprising:

a substantially cylindrical sleeve and centered about a central axis, the central axis extending in an upward/downward direction;

a shaft inserted in the sleeve to be opposed to an inner circumferential surface of the sleeve with a radial gap therebetween;

an annular member including an opening arranged to have the shaft inserted therein, a top portion having a substantially annular shape and arranged to cover an upper surface of the sleeve, and a side portion extending downward from an outer circumferential portion of the top portion so as to cover an outer circumferential surface of the sleeve;

a sleeve housing arranged radially outward of the sleeve and arranged to cover at least a lower portion of the outer circumferential surface of the sleeve;

a capillary seal portion arranged above the radial gap to define a gap extending in an axial direction of the radial gap;

lubricating oil disposed in the radial gap and the capillary seal portion;

a radial dynamic pressure bearing portion defined in the radial gap during rotation to generate fluid dynamic pressure in the lubricating oil retained in the radial gap via a radial dynamic pressure groove;

an outside upper channel arranged radially outward of the radial gap and between the outer circumferential surface of the sleeve and an inner circumferential surface of the annular member, filled with the lubricating oil, and connected to a bottom portion of the radial gap;

an outside lower channel arranged radially outward of the radial gap and between the outer circumferential surface of the sleeve and an inner circumferential surface of the sleeve housing, filled with the lubricating oil, and connected to a bottom portion of the radial gap, a radial dimension of the outside upper channel is larger than a radial dimension of the outside lower channel;

an upper side channel arranged between the upper surface of the sleeve and a lower surface of the top portion of the annular member, filled with the lubricating oil, and arranged to connect the radial gap with the outside upper channel; and either a plurality of projections or a plurality of grooves, the plurality of projections being arranged on the lower surface of the top portion of the annular member and arranged in a circumferential direction to be centered about the central axis and in contact with the upper surface of the sleeve, and the plurality of grooves being opposed to the upper surface of the sleeve and extending from an inner circumferential portion to an outer circumferential portion of the lower surface of the top portion of the annular member.

21. The fluid dynamic bearing according to claim 20, wherein the upper surface of the sleeve includes a plurality of upper surface grooves extending from an inner circumferential portion to an outer circumferential portion; and a circumferential width of the plurality of projections or a portion between the plurality of grooves of the annular member is greater than a circumferential width of the plurality of upper surface grooves of the sleeve.

22. The fluid dynamic bearing according to claim 21, wherein the plurality of upper surface grooves are, when viewed as extending outwardly in a radial direction, inclined in a direction opposite to a rotational direction of the shaft.

23. The fluid dynamic bearing according to claim 21, wherein the plurality of upper surface grooves extend substantially linearly in a radial direction.

24. The fluid dynamic bearing according to claim 21, wherein the lower surface of the top portion of the annular member includes the plurality of grooves provided thereon; and the plurality of upper surface grooves of the sleeve and the plurality of grooves of the annular member are inclined in a direction opposite to a rotational direction of the shaft when viewed as extending outwardly in a radial direction.

25. The fluid dynamic bearing according to claim 20, wherein the lower surface of the top portion of the annular member includes the plurality of grooves provided thereon; and the plurality of grooves are inclined in a direction opposite to a rotational direction of the shaft when viewed as extending outwardly in a radial direction.

26. The fluid dynamic bearing according to claim 20, wherein the plurality of grooves provided on the lower surface of the top portion of the annular member extend substantially linearly in a radial direction.

27. A motor comprising:
the fluid dynamic bearing of claim 20;
a rotor unit including a rotor magnet; and
a stator unit including an armature opposed to the rotor magnet.

28. A recording disk drive apparatus for use with a recording disk, the recording disk drive apparatus comprising:
the motor of claim 27;
an access portion arranged to read or write information from or to the recording disk; and
a housing arranged to retain the motor and the access portion.

* * * * *